United States Patent
Kikkawa

(10) Patent No.: US 10,625,818 B2
(45) Date of Patent: Apr. 21, 2020

(54) POWER ASSIST DEVICE, AND VEHICLE EQUIPPED WITH SAID POWER ASSIST DEVICE

(71) Applicant: Nidec Corporation, Minami-ku Kyoto-shi Kyoto (JP)

(72) Inventor: Jun Kikkawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 39 days.

(21) Appl. No.: 15/760,355

(22) PCT Filed: Aug. 23, 2016

(86) PCT No.: PCT/JP2016/074435
§ 371 (c)(1),
(2) Date: Mar. 15, 2018

(87) PCT Pub. No.: WO2017/047333
PCT Pub. Date: Mar. 23, 2017

(65) Prior Publication Data
US 2018/0257740 A1    Sep. 13, 2018

(30) Foreign Application Priority Data

Sep. 17, 2015  (JP) ................. 2015-184354

(51) Int. Cl.
*B62M 6/50*    (2010.01)
*B60W 30/188*    (2012.01)
*B62B 5/00*    (2006.01)
*B60W 50/00*    (2006.01)

(52) U.S. Cl.
CPC ............ *B62M 6/50* (2013.01); *B60W 30/188* (2013.01); *B62B 5/0073* (2013.01); *B60W 50/00* (2013.01);
(Continued)

(58) Field of Classification Search
CPC ... B60M 6/50; B60W 30/188; B60W 2300/40
See application file for complete search history.

(56) References Cited

U.S. PATENT DOCUMENTS

| 2006/0095191 A1 | 5/2006 | Lin |
| 2014/0062351 A1 | 3/2014 | Spelta et al. |

(Continued)

FOREIGN PATENT DOCUMENTS

| CN | 103429456 A | 12/2013 |
| CN | 103661393 A | 3/2014 |

(Continued)

OTHER PUBLICATIONS

International Search Report corresponding to Application No. PCT/JP2016/074435; dated Nov. 8, 2016.

*Primary Examiner* — Tony H Winner
(74) *Attorney, Agent, or Firm* — Cantor Colburn LLP

(57) ABSTRACT

A power assist device may include a motor, a motor driving circuit, sensors to output signals in accordance with a rotational speed of the wheel, a memory, and a signal processor. The memory stores information of a parameter defining a transfer function that interrelates a total torque to be input to the vehicle and a rotational speed of the wheel, and an inverse transfer function thereof. Based on the inverse transfer function, the signal processor determines an estimated value of total torque from a detected value of rotational speed of the wheel. Moreover, based on the transfer function, the signal processor updates at least a portion of the information of the parameter so that, for example, an error between a detected value of rotational speed of the wheel and an estimated value of rotational speed of the wheel as determined from the estimated value of total torque is reduced.

19 Claims, 11 Drawing Sheets

(52) U.S. Cl.
CPC .............. *B60W 2050/0014* (2013.01); *B60W 2050/0019* (2013.01); *B60W 2300/36* (2013.01); *B60W 2300/40* (2013.01); *B60W 2400/00* (2013.01); *B60W 2420/503* (2013.01); *B60W 2510/083* (2013.01); *B60W 2510/09* (2013.01); *B60W 2520/28* (2013.01); *B60W 2530/16* (2013.01); *B60W 2550/142* (2013.01); *B60W 2710/083* (2013.01); *B62B 5/0033* (2013.01)

(56) References Cited

U.S. PATENT DOCUMENTS

| | | |
|---|---|---|
| 2014/0067154 A1 | 3/2014 | Yu et al. |
| 2015/0120119 A1 | 4/2015 | Tauchi et al. |
| 2015/0191215 A1* | 7/2015 | Kawakami .............. B62M 6/55 477/4 |
| 2016/0200355 A1 | 7/2016 | Mori et al. |
| 2017/0113757 A1* | 4/2017 | Kaindl .................... B62M 6/45 |
| 2017/0313380 A1* | 11/2017 | Corno ..................... B62M 6/45 |
| 2018/0086417 A1* | 3/2018 | Baumgaertner ......... B62M 6/45 |

FOREIGN PATENT DOCUMENTS

| | | |
|---|---|---|
| CN | 103803005 A | 5/2014 |
| CN | 104584423 A | 4/2015 |
| JP | H0986476 A | 3/1997 |
| JP | 2004025913 A | 1/2004 |
| JP | 2013256198 A | 12/2013 |
| KR | 20140142117 A | 12/2014 |

\* cited by examiner

POWER ASSIST DEVICE, AND VEHICLE EQUIPPED WITH SAID POWER ASSIST DEVICE

CROSS REFERENCE TO RELATED APPLICATIONS

This is the U.S. national stage of application No. PCT/JP2016/074435, filed on Aug. 23, 2016. Priority under 35 U.S.C. § 119(a) and 35 U.S.C. § 365(b) is claimed from Japanese Application No. 2015-184354, filed on Sep. 17, 2015, the disclosure of which is also incorporated herein by reference.

TECHNICAL FIELD

The present disclosure relates to a power assist device which assists a person with an electric motor, and an electrically assisted vehicle incorporating the power assist device.

BACKGROUND ART

Electrically assisted vehicles, in which an operator of the vehicle is assisted by using a motor, are becoming prevalent. A typical example of an electrically assisted vehicle is an electrically assisted bicycle. In an electrically assisted bicycle, when a person applies a pedaling force to the pedals of the bicycle, a motor which is mounted on the bicycle adds a driving power. A similar function is beginning to be featured on vehicles other than electrically assisted bicycles, e.g., a trolley or baby stroller that moves with an applied human force. The driving power which is conferred to a vehicle by a human force is representable as "human torque", whereas the driving power of a motor is representable as "motor torque".

In order for the motor to be able to assist an operator of the vehicle, the power assist device needs to detect an applied human torque, and appropriately control the motor torque. As the motor outputs an appropriate motor torque, an assist is realized which is comfortable to the person. A torque sensor has conventionally been used in order for the power assist device to detect the human torque. On the other hand, there are needs for downsizing, simplification, cost reduction, etc., of the device, and thus a human torque estimation technique is needed that does not require a torque sensor.

Patent Document 1 and Patent Document 2 disclose techniques for controlling an electrically assisted bicycle without using a torque sensor.

In the bicycle with an electric motor disclosed in Patent Document 1, a transfer function of the bicycle mechanism and an inverse of the transfer function are provided in advance. The bicycle mechanism is modeled as a system that interrelates a total torque which is applied to the bicycle (including a human torque and a motor torque) and an angle of rotation of a wheel of the bicycle. The transfer function has a moment of inertia and a viscous drag as parameters defining this bicycle mechanism. By using an inverse of such a transfer function, a total torque is determined from the angle of rotation of the wheel. Thereafter, an estimated value of the human torque is determined by subtracting the motor torque from the total torque.

The electrically assisted vehicle disclosed in Patent Document 2 calculates any torque other than the motor torque as a disturbance torque, by using a disturbance observer. The disturbance torque includes a travel load torque and a human torque. This electrically assisted vehicle calculates the human torque by subtracting the travel load torque from the disturbance torque.

CITATION LIST

Patent Literature

Patent Document 1: Japanese Laid-Open Patent Publication No. H9-086476
Patent Document 2: Japanese Laid-Open Patent Publication No. 2013-256198

SUMMARY OF INVENTION

Technical Problem

When a vehicle travels in an actual environment in which it is used, the moment of inertia in the bicycle mechanism will change with changes in the weight of the bicycle operator and the luggage weight. Moreover, viscous drag may change depending on the state of the traveled terrain, the maintenance status of the vehicle, and so on. In the bicycle with an electric motor of Patent Document 1, the moment of inertia and viscous drag are treated as fixed values, and their changes are not accounted for. In the electrically assisted vehicle of Patent Document 2, calculation of a total torque by using parameters defining the bicycle mechanism is not performed in the first place.

Various embodiments of the present disclosure make it possible to realize an electrically assisted vehicle which identifies parameters defining a model of a vehicle mechanism, and sequentially updates their values.

Solution to Problem

A power assist device according to an illustrative embodiment of the present disclosure is a power assist device for a vehicle which includes a wheel and which is driven by a human force, the power assist device comprising: a motor to generate a motor torque; a motor driving circuit to supply an electric power to the motor; a sensor to output a signal which is in accordance with a rotational speed of the wheel; a memory storing information of a parameter defining a transfer function that interrelates a total torque to be input to the vehicle and a rotational speed of the wheel, and an inverse transfer function thereof; and a signal processor connected to the memory and the motor driving circuit. The signal processor (0) receives the signal which is output from the sensor, and determines a detected value of rotational speed of the wheel, (1) reads information of the parameter from the memory, and, based on the inverse transfer function defined by the parameter, determines an estimated value of total torque from the detected value of rotational speed of the wheel, (2) acquires information representing an operating state of the motor, and, based on the information, determines an estimated value of motor torque that is being generated by the motor, (3) determines an estimated value of human torque based on a value which is obtained by subtracting the estimated value of motor torque from the estimated value of total torque, (4) determines a command value for motor torque based on the estimated value of human torque, and inputs the command value for motor torque to the motor driving circuit, and (5) updates at least a portion of the information of the parameter stored in the memory so that an error between the detected value of rotational speed of the wheel and an estimated value of rotational speed of the wheel that is determined from a given torque value based on the transfer function defined by the parameter is reduced.

According to an illustrative embodiment of the present disclosure, an electrically assisted vehicle comprises a wheel and the aforementioned power assist device. The motor of the power assist device is mechanically connected to the wheel. The wheel rotates with a human torque from an operator and a motor torque from the motor.

According to an illustrative embodiment of the present disclosure, a signal processing module comprises: a memory storing information of a parameter defining a transfer function that interrelates a total torque to be input to an electrically assisted vehicle which includes a motor and a wheel and a rotational speed of the wheel, and an inverse transfer function thereof; and a signal processor connected to the memory. When incorporated in the electrically assisted vehicle, the signal processor is connected to a sensor to output a signal which is in accordance with the rotational speed of the wheel and to a driving circuit for the motor. The signal processor (0) receives the signal which is output from the sensor, and determines a detected value of rotational speed of the wheel, (1) reads information of the parameter from the memory, and, based on the inverse transfer function defined by the parameter, determines an estimated value of total torque from the detected value of rotational speed of the wheel, (2) from the driving circuit, acquires information representing an operating state of the motor, and, based on the information, determines an estimated value of motor torque that is being generated by the motor, (3) determines an estimated value of human torque based on a value which is obtained by subtracting the estimated value of motor torque from the estimated value of total torque, (4) determines a command value for motor torque based on the estimated value of human torque, and inputs the command value for motor torque to the driving circuit, and (5) updates at least a portion of the information of the parameter stored in the memory so that an error between the detected value of rotational speed of the wheel and an estimated value of rotational speed of the wheel that is determined from a given torque value based on the transfer function defined by the parameter is reduced.

According to an illustrative embodiment of the present disclosure, a power assist device for use in estimating a human torque to be applied to a vehicle mechanism of an electrically assisted vehicle by using a system parameter of the vehicle mechanism, calculating a torque for a motor from the estimated human torque, and driving the electrically assisted vehicle with the human torque and the torque of the motor, wherein the system parameter of the vehicle mechanism is updated at a moment when the human torque is not being applied to the electrically assisted vehicle.

Advantageous Effects of Invention

According to an illustrative embodiment of the present disclosure, a power assist device or a signal processing module identifies parameters defining a model of a vehicle mechanism, and sequentially updates their values. As a result, the power assist device or signal processing module is able to accurately calculate an assist ratio or an assist amount while factoring in changes in the external environment. With an electrically assisted vehicle including the power assist device, an operator of the vehicle is able to receive optimum assistance.

DESCRIPTION OF EMBODIMENTS

Hereinafter, with reference to the attached drawings, embodiments of a power assist device, and a vehicle including the power assist device, according to the present disclosure will be described in detail.

Embodiment 1

Figure 1:
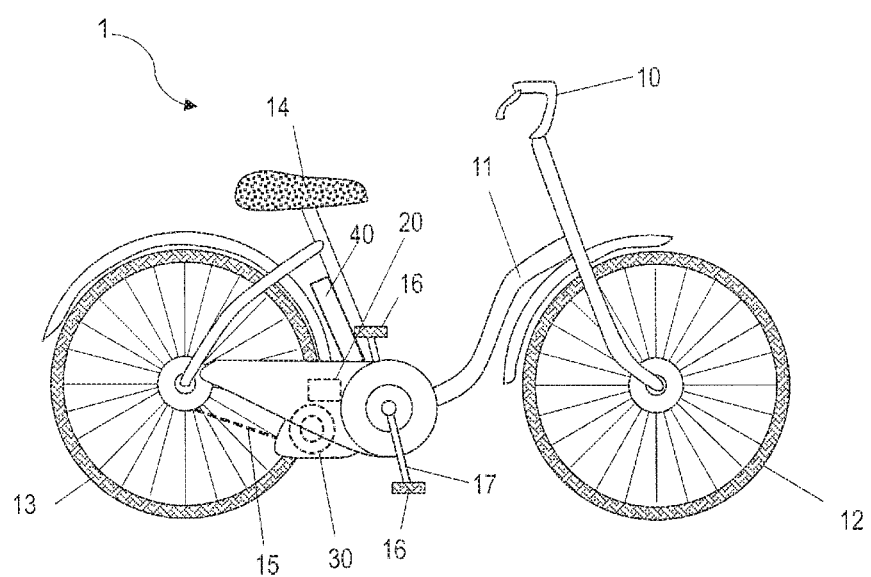
FIG. 1 is a diagram showing an electrically assisted bicycle 1 according to an illustrative embodiment of the present disclosure.

FIG. 1 shows an electrically assisted bicycle 1 according to a non-limiting, illustrative embodiment of the present disclosure. The electrically assisted bicycle 1 is a bicycle which assists a human by using a motor.

In addition to any parts belonging to a generic bicycle, the electrically assisted bicycle 1 includes a microprocessor 20 which is a signal processor, a motor 30, and a battery 40. Example parts to be included in a generic bicycle are handle bars 10, a frame 11, a front wheel 12, a rear wheel 13, a saddle 14, a chain 15, pedals 16, and cranks 17. The rear wheel 13 is mechanically connected to the motor 30 via the chain 15. The rear wheel 13 rotates with a human torque that is applied by the pedals 16 and a motor torque that is applied by the motor 30. As a result of this, the electrically assisted bicycle 1 is driven. Note that the construction of the electrically assisted bicycle 1 shown in FIG. 1 is only an example, and other exemplary constructions may also be adopted. For example, the electrically assisted bicycle 1 is not limited to an implementation where the motor 30 and the rear wheel 13 are mechanically connected via the chain 15. The motor 30 may be provided on the front wheel 12 to generate a motor torque with which to directly drive the front wheel 12.

The battery 40 may be a rechargeable battery (secondary battery), such as a lithium ion battery or a nickel-hydrogen battery.

With a power assist device which includes the aforementioned microprocessor 20 and motor 30, the electrically assisted bicycle 1 assists a bicycle operator who moves the pedals 16. Hereinafter, with reference to FIG. 2, a detailed construction of the power assist device will be described.

Figure 2:
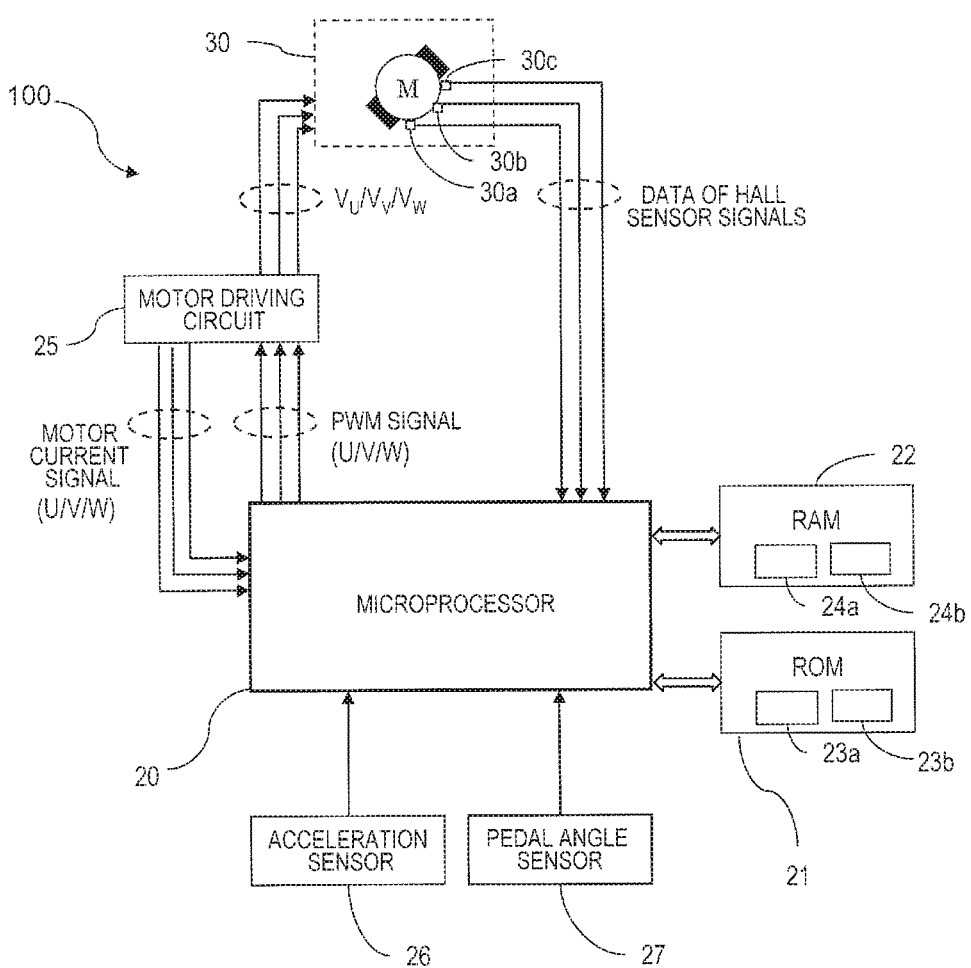
FIG. 2 is a diagram showing a detailed exemplary hardware construction of a power assist device 100 mounted in the electrically assisted bicycle 1.

FIG. 2 shows a detailed exemplary hardware construction of a power assist device 100 mounted in the electrically assisted bicycle 1. The power assist device 100 includes a microprocessor 20, a ROM (Read-Only Memory) 21, a RAM (Random Access Memory) 22, a motor driving circuit 25, an acceleration sensor 26, a pedal angle sensor 27, and the motor 30.

The microprocessor 20 is a semiconductor integrated circuit which provides overall control of the operation of the power assist device 100. The microprocessor 20 receives signals from various sensors, and controls driving of the motor 30 by using these signals. For example, the microprocessor 20 receives data of Hall sensor signals to calculate a rotational speed of the motor 30. Furthermore, from the rotational speed of the motor 30, the microprocessor 20 calculates a current rotational speed ω of the front wheel 12 or the rear wheel 13. In other words, the signal processor receives signals which are output from the sensors, and determines a detected value of rotational speed of a wheel.

Figure 3:
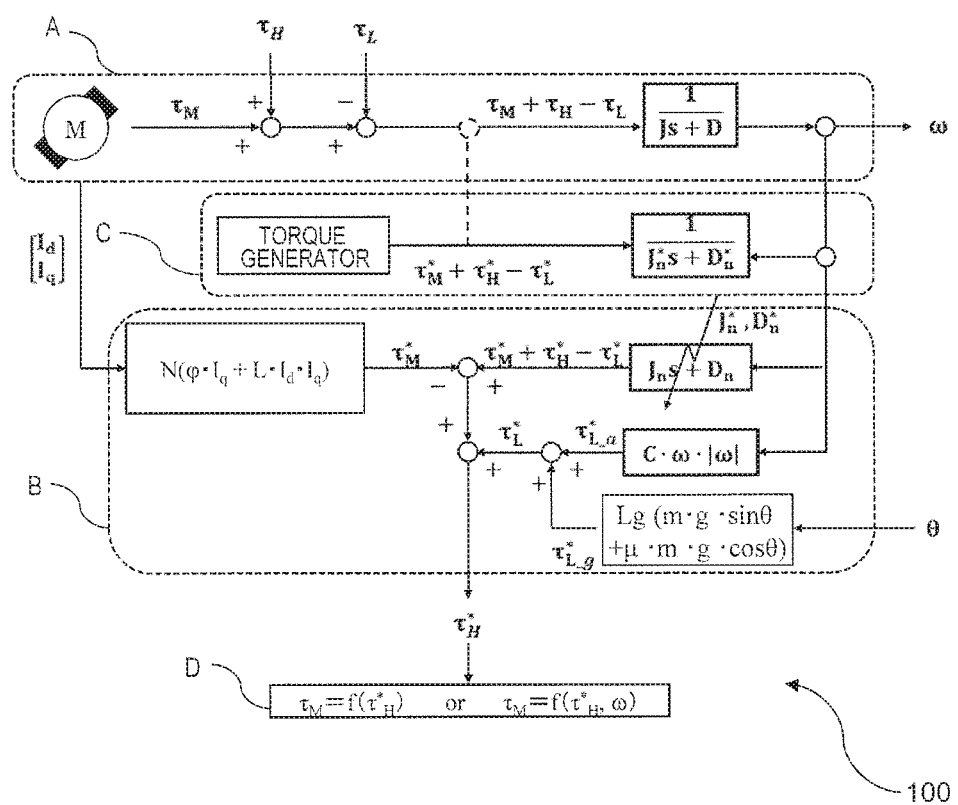
FIG. 3 is a system block diagram showing an electrically assisted bicycle including the power assist device 100.

The present embodiment assumes that a certain relationship exists between the rotational speed of the motor and the rotational speed of a wheel, or that the rotational speed of a wheel can be determined through mathematical computation from the rotational speed of the motor. For example, a rotational speed ω of the wheel can be determined by multiplying the rotational speed of the motor with a predetermined coefficient. In the case of a multi-speed electrically assisted bicycle, coefficients are adapted to the gears are provided, such that the microprocessor 20 multiplies the rotational speed of the motor 30 with a coefficient that corresponds to the currently selected gear. However, a wheel speed sensor that directly measures a wheel speed may be provided on the front wheel 12 or the rear wheel 13. In FIG. 3 and later, for simplicity of description, the system of an electrically assisted bicycle 1 is modeled by utilizing the rotational speed ω of the front wheel 12 or the rear wheel 13.

Moreover, the microprocessor 20 receives a motor current signal from the motor driving circuit 25. Based on the motor current signal, the microprocessor 20 calculates an estimated value of motor torque that is being generated by the motor.

By utilizing the rotational speed ω of the wheel, the estimated value of motor torque having been acquired, etc., the microprocessor 20 calculates a currently estimated value of human torque. The microprocessor 20 determines a motor torque which is in accordance with the estimated value of human torque, and inputs to the motor driving circuit 25 a command value for generating that motor torque, as a PWM (Pulse Width Modulation) signal. Moreover, with the detected values from various sensors and the calculated estimated values, the microprocessor 20 updates the information of parameters defining a transfer function and an inverse transfer function of the system of the electrically assisted bicycle 1. A more detailed operation of the microprocessor 20 will be described later.

The ROM 21 is a non-volatile memory, which may be an EEPROM (Electrically Erasable Programmable Read-Only Memory), for example. The ROM 21 stores a computer program 23a and initial values 23b of parameters that are provided in advance. The computer program 23a and the initial values 23b of parameters are read by the microprocessor 20 at the beginning of operation of the power assist device 100.

The RAM 22 is typically a volatile storage device. The computer program 23a and initial values 23b of parameters as are read from the ROM 21 by the microprocessor 20 at the beginning of operation are laid out on the RAM 22. FIG. 2 schematically shows, as laid out on the RAM 22, the computer program 24a having been read and parameters 24b to which the initial values 23b of parameters are updated through the processing according to the present disclosure. The computer program 24a is a set of instruction codes for performing a process which is described as the processing by the microprocessor 20 in FIG. 5 and FIG. 6 (referred to below) and in the specification. The parameters 24b are information defining a transfer function of the dynamics of the electrically assisted bicycle 1 and an inverse transfer function thereof as will be described below. The RAM 22 also functions as a work memory of the microprocessor 20.

Although the aforementioned microprocessor 20, the ROM 21, and the RAM 22 are provided as separate elements, this is an example. For example, the microprocessor 20, the ROM 21, and the RAM 22 may be integrated by using an FPGA (Field-Programmable Gate Array).

In the present embodiment, the microprocessor 20, the ROM 21, and the RAM 22 may be referred to as a signal processing module. The signal processing module may be implemented on a single substrate, for example. Various implementations may be possible for the signal processing module. For example, in addition to the microprocessor 20, the ROM 21, and the RAM 22, it may also include the motor driving circuit 25. Alternatively, the microprocessor 20 may be divided into a functional element that executes a sequential least squares algorithm and a functional element that generates a PWM signal. The functional element that executes a sequential least squares algorithm, the ROM 21, and the RAM 22 may be referred to as the signal processing module. Note that the functional element that generates a PWM signal and the motor driving circuit 25 may be integrated into an intelligent power module for implementation. Such a signal processing module is applicable to a human assistance system, such as a powered exoskeleton suit. In other words, the applications of the signal processing module are not limited to vehicles.

Hall sensors 30a to 30c, as will be described later, output analog or digital Hall sensor signals which are in accordance with the rotational speed of the motor 30. The Hall sensors 30a to 30c output analog Hall sensor signals. Herein, an AD conversion circuit may be provided internally to the microprocessor 20, or an AD conversion circuit may be provided externally to the microprocessor 20. The AD conversion circuit receives analog Hall sensor signals, samples the Hall sensor signals e.g. with a predetermined sampling frequency, and quantizes the sampled values, thereby generating digital electrical signals (data of Hall sensor signals). Alternatively, the Hall sensors 30a to 30c may include Hall ICs, such that the Hall ICs generate data of Hall sensor signals. In the following embodiments, it is assumed that the Hall sensors 30a to 30c include Hall ICs, these Hall ICs being used to generate and output data of Hall sensor signals. The microprocessor 20 receives data of Hall sensor signals which are output from the Hall sensors 30a to 30c.

The motor driving circuit 25 includes an inverter circuit which outputs three-phase AC power. Based on the PWM signal received from the microprocessor 20, the motor driving circuit 25 generates voltages of the respective phases U, V and W to supply electric power to the motor 30.

The acceleration sensor 26 is, for example, a sensor which is capable of detecting acceleration with respect to two axes, i.e., the direction of travel of the bicycle and a direction perpendicular thereto. As will be described later, the microprocessor 20 acquires information of the angle of inclination of the road surface, by utilizing the output from the acceleration sensor 26. A sensor which is capable of directly acquiring the angle of inclination of the road surface may also be used. Irrespective of whether the acceleration value is calculated through computation by the microprocessor or the like, or the acceleration value is acquired as a direct output from a sensor, in the present disclosure any sensor that outputs a signal with which to acquire the angle of inclination of the road surface will be generally referred to as an inclination angle sensor.

The pedal angle sensor 27 may be a known magnetic rotary encoder, for example. With a rotating disk or drum having a magnetic pattern formed thereon, a magnetic rotary encoder captures rotary position information as periodic changes in the magnetic field.

The motor 30 generates a motor torque with the electric power that is supplied from the motor driving circuit 25. Although the present embodiment illustrates the motor 30 as a three-phase synchronous motor, this is an example. The motor 30 may be a three-phase induction motor, or any other type of motor. In the case where other type of motor is used as the motor 30, the command value for causing a motor torque to be generated is not limited to a PWM signal. The motor 30 includes the Hall sensors 30a to 30c. The Hall sensors 30a to 30c output signals which are in accordance with the rotational speed of the motor 30.

FIG. 3 is a system block diagram of an electrically assisted bicycle including the power assist device 100. The control system of the power assist device 100 is generally divided into four Blocks A through D. Block A represents dynamics of the bicycle mechanism. Block B represents a torque sensorless technique described below. Block C represents a parameter identification technique using a sequential least squares algorithm. Block D represents a human torque assisting technique (also referred to as a power assist technique) by the motor 30. Table 1 depicts meanings of symbols that are employed in FIG. 3 and the like.

TABLE 1

| | |
|---|---|
| $\tau_M$; OUTPUT TORQUE OF MOTOR | $\tau_M^*$; ESTIMATED VALUE FOR THE LEFT |
| $\tau_H$; PEDAL TORQUE OF BICYCLE OPERATOR | $\tau_H^*$; ESTIMATED VALUE FOR THE LEFT |
| $\tau_L$; TRAVEL LOAD TORQUE | $\tau_L^*$; ESTIMATED VALUE FOR THE LEFT |
| J; MOMENT OF INERTIA OF BICYCLE MECHANISM | $J_n$; NOMINAL VALUE FOR THE LEFT |
| D; VISCOUS DRAG COEFFICIENT OF BICYCLE MECHANISM | $D_n$; NOMINAL VALUE FOR THE LEFT |
| $I_d$; D-AXIS COMPONENT OF MOTOR CURRENT | $I_q$; Q-AXIS COMPONENT OF MOTOR CURRENT |
| N; NUMBER OF POLE PAIRS | $\varphi$; FLUX LINKAGE |
| L; VALUE OBTAINED BY SUBTRACTING Q-AXIS INDUCTANCE FROM D-AXIS INDUCTANCE | |
| $\omega$; ROTATIONAL SPEED OF WHEEL (VELOCITY OF TRAVEL) | |
| s; LAPLACE OPERATOR | |

Note that any symbol with "*" denotes an estimated value.

Hereinafter, details of Blocks A through D will be described.

A. Dynamics of Bicycle Mechanism

On the assumption that the dynamics of the bicycle mechanism is a linear system, the inventors have modeled its transfer function G(s) as a transfer function $G(s)=1/(Js+D)$ of first order lag. The input to the transfer function G(s) is an overall torque $\tau_M+\tau_H-\tau_L$, which is a sum total of: an output torque $\tau_M$ of the motor; a human torque (which may also be referred to as a "pedal torque" as far as vehicles with pedals at large are concerned) $\tau_H$ of the bicycle operator; and a travel load torque $\tau_L$ acting in a direction against the travel.

The output of the transfer function G(s) is a rotational speed (velocity of travel) $\omega$ of a wheel. As has been described in connection with FIG. 2, the rotational speed (velocity of travel) $\omega$ of the wheel can be determined based on the rotational speed of the motor by using Hall sensor signals.

J and D, included in the transfer function G(s), are factor parameters that govern dynamic characteristics. Parameters J and D, which are time constants, respectively are a moment of inertia and a viscous drag coefficient of the bicycle mechanism, as indicated in Table 1. As their initial values, standard values which are determined from e.g. the structure and weight of the bicycle, the expected weight of the operator, and so on may be set.

For example, in Patent Document 1, parameters J and D are treated as fixed values. However, in the present embodiment, parameters J and D are regarded as variable values ($J_n$ and $D_n$; where n is an integer). The reason is that parameter J may change depending on the weight of the bicycle operator or the luggage weight, while parameter D may change depending on the state of the traveled terrain, the degree of wear and deterioration of the bicycle mechanism, or its state of maintenance. Fluctuations in parameters J and D are directly linked to an input-output relationship between the overall torque $\tau_M+\tau_H-\tau_L$ that is applied to the bicycle mechanism and the rotational speed (velocity of travel) $\omega$ of the wheel. Accordingly, on the premise that parameters J and D fluctuate, the inventors have arrived at the concept that a pedal torque TH can be estimated more accurately by sequentially updating parameters J and D.

As mentioned above, parameters J and D may change depending on the weight of the bicycle operator, the luggage weight, the traveling environment, and the like. In other words, they are of such a nature that they change with lapse of time. Although the dynamics of the bicycle mechanism is herein modeled as a linear system, it may be said, strictly speaking, that it has the property of not a time-invariant system but a time-variant system.

The microprocessor 20 according to the present embodiment sequentially updates $J_n$ and $D_n$ based on a parameter identification technique as will be described later. As a result, the power assist device 100 is able to ensure that the characteristics of $J_n \cdot s + D_n$, i.e., an inverse transfer function of the dynamics of the bicycle mechanism, will keep matching its operating environment. Furthermore, an estimated value for the pedal torque TH will follow the actual pedal torque. As a result, the microprocessor 20 is able to estimate a more accurate total torque, thus allowing to reduce an error between the output of a transfer function to which this total torque is input, i.e., an estimated value of rotational speed of the motor, and a detected value of rotational speed of the motor. Therefore, according to the present embodiment, in order to account for the changing nature of parameters J and D, the microprocessor 20 sequentially updates parameters J and D. As a result, as compared to any conventional bicycle mechanism whose control system is designed with respect to fixed parameters J and D, the present embodiment is able to accurately estimate the pedal torque TH.

B. Torque Sensorless Technique

In Block B, a plurality of computation processes are performed by using various inputs, thereby determining a pedal torque estimated value $\tau^*_H$. The plurality of computation processes include: (B1) a process of calculating an output torque estimated value $\tau^*_M$ of the motor; (B2) a process of calculating a total torque estimated value ($\tau^*_M + \tau^*_H - \tau^*_L$); (B3) a process of calculating a travel load torque estimated value $\tau_L^*$; and (B4) a process of calculating a pedal torque estimated value $\tau^*_H$.

(B1) Process of Calculating an Output Torque Estimated Value $\tau^*_M$ of the Motor In the present embodiment, rotation of the motor is controlled by using a vector control technique.

At the left end of broken-line box B in FIG. 3, N(•) denotes that, with inputs of a d-axis component $I_d$ and a q-axis component $I_q$ of the motor current, a process of outputting an output torque estimated value $\tau^*_M$ of the motor as a calculation result is performed. N(•) expresses T-I (torque-current) characteristics of the motor as a calculation formula. In other words, N(•) is an equation that models a torque calculation process. As indicated in Table 1, φ in N(•) denotes flux linkage, and L denotes a value obtained by subtracting the q-axis inductance from the d-axis inductance.

Note that it is not essential for the motor to utilize the aforementioned vector control technique. Rotation of the motor may be controlled by a method other than the vector control technique; in that case, estimation of an output torque of the motor can be made on the basis of that technique.

(B2) Process of Calculating a Total Torque Estimated Value $(\tau^*_M + \tau^*_H - \tau^*_L)$ At the right end of broken-line box B in FIG. 3, $(J_n \cdot s + D_n)$ is an equation that models, by using nominal parameters $J_n$ and $D_n$, an inverse transfer function of the transfer function G(s) which was mentioned in "A. dynamics of bicycle mechanism". Nominal parameters $J_n$ and $D_n$ are values which are obtained through the process of "C. parameter identification technique" described below, i.e., an estimated value. FIG. 3 illustrates that $J^*_n$ and $D^*_n$, indicated as estimated values, are input to $(J_n \cdot s + D_n)$.

$(J_n \cdot s + D_n)$ outputs an estimated value $\tau^*_M + \tau^*_H - \tau^*_L$ for the actual overall torque $\tau_M + \tau_H - \tau_L$ that is presumably be acting on the bicycle, with the rotational speed ω of the wheel being input thereto. In other words, $(J_n \cdot s + D_n)$ corresponds to an inverse calculation relative to the actual dynamics 1/(Js+D) of the bicycle mechanism.

(B3) Process of Calculating Travel Load Torque Estimated Value $\tau^*_L$

Generally speaking, a travel load torque $\tau_L$ of the bicycle mechanism is calculable from mainly the following three elements.

- an aerodynamic resistance torque estimated value $\tau^*_{L\_a}$ which is ascribable to an atmospheric velocity that occurs, as the bicycle travels, between the atmosphere and the bicycle mechanism including the bicycle operator
- a slope resistance torque estimated value $\tau^*_{L\_g}$, which is a sum total of: a load resistance torque estimated value that occurs due to friction existing between the bicycle mechanism and the road surface as the bicycle travels on the road surface; and a load resistance torque estimated value which is ascribable to a gravity component (that acts in a direction of obstructing movement or enhancing movement) occurring in the bicycle mechanism including the bicycle operator as the bicycle travels on an inclined road surface Hereinafter, methods of calculating the respective load resistance torques will be described.

(B3-1) Aerodynamic Resistance Torque

The inventors have modeled an aerodynamic resistance torque based on the following assumptions:

The aerodynamic force that acts while the bicycle is traveling is limited to within only a two-dimensional plane that contains the direction of travel of the bicycle and the vertical direction.

The aerodynamic force is proportional to a square of the velocity of travel.

Specifically, the aerodynamic resistance torque is represented by eq. 1 below.

$$\tau^*_{L\_a} = C \cdot |\omega| \cdot \omega \quad \text{(eq. 1)}$$

In eq. 1, "C" means an aerodynamic resistance torque coefficient. This coefficient is, generally speaking, a nonlinear function whose explanatory variables are the air density, the geometric area that blocks airflow, the moment arm between the central position of aerodynamic force and the position of the mechanical center of the dynamics of the bicycle mechanism, and the like. However, the inventors have assumed that the coefficient C is a constant value.

(B3-2) Slope Resistance Torque

A case where the bicycle travels on a slope with inclination will be considered. Let the angle of inclination of the slope be θ. Let the total mass of the bicycle operator, the luggage, and the bicycle be m, and the acceleration of gravity be g. A gravitational force (vertically downward) m·g acting on the total mass can be decomposed into a component (m·g·sin θ) along the direction of the slope and a component (m·g·cos θ) along a perpendicular direction to the slope. Between these, a torque (slope resistance torque) $\tau^*_{L\_g}$ which is ascribable to the component along the direction of the slope can be expressed by eq. 2 below.

$$\tau^*_{L\_g} = L_g(m \cdot g \cdot \sin \theta + \mu \cdot m \cdot g \cdot \cos \theta) \quad \text{(eq. 2)}$$

Herein, μ is a friction coefficient. μ may have any arbitrary value, which is supposed to be a constant value. $L_g$ represents the moment arm between the position of the center of gravity and the position of the mechanical center of the dynamics of the bicycle mechanism. So long as motion of the bicycle mechanism including the bicycle operator is limited to within a two-dimensional plane that contains the direction of travel of the bicycle and the vertical direction and the position of the center of gravity does not change, the moment arm $L_g$ can be regarded as a constant value. In actuality, however, the motion would not be within a two-dimensional plane; rather, the motion would be three-dimensional. By assuming that the motion is within a two-dimensional plane, the inventors have simplified the model.

As described above, it is believed that the travel load torque estimated value $\tau^*_L$ is composed of two elements, i.e., aerodynamic resistance torque and slope resistance torque. Therefore, the travel load torque estimated value $\tau^*_L$ is calculated from eq. 3 below.

$$\tau^*_L = \tau^*_{L\_a} + \tau^*_{L\_g} \quad \text{(eq. 3)}$$

(B4) Process of Calculating a Pedal Torque Estimated Value $\tau^*_H$

The aforementioned process (B2) has provided the total torque estimated value $(\tau^*_M + \tau^*_H - \tau^*_L)$. Moreover, process (B1) has provided the output torque estimated value $\tau^*_M$ of the motor, and process (B3) has provided the travel load torque estimated value $\tau^*_L$.

Therefore, an estimated value $\tau^*_H$ of pedal torque is calculated by eq. 4 below.

$$\tau^*_H = \text{estimated value } (\tau^*_M + \tau^*_H - \tau^*_L) \text{ of total torque} - \text{output torque estimated value } \tau^*_M \text{ of motor} + \text{travel load torque estimated value } \tau^*_L \quad \text{(eq. 4)}$$

The aforementioned pedal torque estimated value $\tau^*_H$ may contain errors due to various factors. Specifically:

(i) a calculation error of the output torque estimated value $\tau^*_M$ of the motor;

(ii) a calculation error of the overall torque estimated value $\tau^*_M + \tau^*_H - \tau^*_L$ because of the nominal values $J_n$ and $D_n$ differing from the actual true values J and D;

(iii) a calculation error of the travel load torque estimated value $\tau^*_L$;

(iv) detection error margins for the d-axis component $I_d$ and the q-axis component $I_q$ of the motor current; and (v) a detection error margin for the rotational speed ω of the wheel.

Once each of the above is remedied so that the only remaining error factors are the differences between the nominal values $J_n$ and $D_n$ and the actual true values J and D, then the "parameter identification technique" as presented in C. below provides a remedy for this.

C. Parameter Identification Technique Using Sequential Least Squares Algorithm

The rationale for applying the "parameter identification technique" is that, when one contemplates the actual traveling of a bicycle, factor parameters J and D which govern the dynamics of the bicycle mechanism (transfer function: G(s)=1/(Js+D)) will fluctuate even under the usual use conditions. By identifying this fluctuation with the "parameter identification technique", the accuracy of estimation of the pedal torque $\tau^*_H$ to be estimated by the "torque sensorless technique" can be improved.

That is, the following operating principles are applied.

(i) Using a sequential least squares algorithm, parameters $J_n$ and $D_n$ are calculated.

(ii) By using the calculation results of $J_n$ and $D_n$, characteristics of the block $J \cdot s + D_n$ in the "torque sensorless technique" as indicated in B above are sequentially updated in real time.

(iii) An inverse transfer function $J_n \cdot s + D_n$ of the dynamics of the bicycle mechanism as calculated by the "torque sensorless technique" is kept consistent with the "inverse" dynamics of the actual bicycle mechanism. Further, the estimated value $\tau^*_H$ of pedal torque is kept consistent with the actual pedal torque.

In Block C of FIG. 3, a torque generator determines a torque value to be input to the blocks $(1/J^*_n \cdot s + D^*_n)$ and $(1/J \cdot s + D)$. The torque generator may be, for example, an arithmetic circuit that is capable of determining a torque value for use in computations.

Hereinafter, as a first example, a process that utilizes an estimated value of total torque as determined in Block B will be described. Thereafter, as a second example, a process that does not utilize an estimated value of total torque but utilizes a value of another torque will be described.

First Example

In the first example, as the torque value to be input to the blocks $(1/J^*_n \cdot s + D^*_n)$ and $(1/J \cdot s + D)$, the torque generator utilizes the estimated value $(\tau^*_M + \tau^*_H - \tau^*_L)$ of total torque as determined in Block B.

Figure 4:
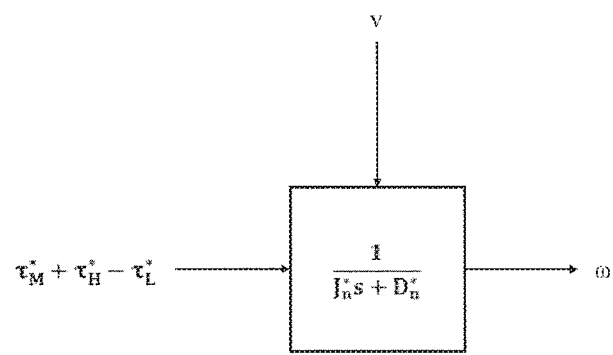
FIG. 4 is a diagram showing a dynamics model of a bicycle mechanism.

FIG. 4 shows a dynamics model of the bicycle mechanism. In the figure, "v" denotes noise. Noise v is based on the assumption that an additive noise will be imposed that consists of a calculation error of the total torque estimated value $\tau^*_M + \tau^*_H - \tau^*_L$, and a detection error margin for the rotational speed ω of the wheel as an output. In other words, although strictly speaking the detection error margin for the output ω and noise v are uncorrelated, it is assumed that noise v will act on $(J^*_n \cdot s + D^*_n)$, which is subject to error, so as to become consistent with the detection error margin for the output ω. In terms of engineering, such an assumption should present no problem. The reason is that noise v does not have the property of a drift noise or the like; given that noise v has a white-noise like property, then noise v is a component which will be eliminated from the contemplated model once the "parameter identification technique", i.e., the least-squares method, is applied. The inventors have adopted the present model from the standpoint that noise v lacks the property of a drift noise or the like, but has a white-noise like property.

The input-output relationship of the model of FIG. 4 is as follows.

$$\omega = (1/J^*_n \cdot s + D^*_n) \cdot (\tau^*_M + \tau^*_H - \tau^*_L + v) \quad \text{(eq. 5)}$$

eq. 5 is transformed into the following.

$$J^*_n \cdot s \cdot \omega = \tau^*_M + \tau^*_H - \tau^*_L - D^*_n \cdot \omega + v \quad \text{(eq. 6)}$$

By transforming eq. 6 on the notion that "s" is a differential element, eq. 7, which is an ordinary differential equation, is obtained.

$$J^*_n \cdot \dot{\omega} = \tau^*_M + \tau^*_H - \tau^*_L - D^*_n \cdot \omega + v \quad \text{(eq. 7)}$$

Note that "ω·" represents a derivative of the rotational speed (angular rate) ω, i.e., angular acceleration. By using eq. 8 to eq. 10 shown below and the relationship v=vt, eq. 7, which is in the form of an ordinary differential equation, is replaced by eq. 11, which is in the form of a difference equation.

[math. 1]

$$\dot{\omega} = \frac{\omega_t - \omega_{t-1}}{\delta t} \quad \text{(eq. 8)}$$

$$\omega = \omega_t \quad \text{(eq. 9)}$$

$$\tau^*_M + \tau^*_H - \tau^*_L = \tau^*_{t-1} \quad \text{(eq. 10)}$$

$$J^*_n \cdot \frac{\omega_t - \omega_{t-1}}{\delta t} = \tau^*_{t-1} - D^*_n \cdot \omega_t + v_t \quad \text{(eq. 11)}$$

Herein, δt denotes a sampling interval.

Eq. 11 is rearranged to give eq. 12.

[math. 2]

$$\omega_t = -a \cdot \omega_{t-1} + b \cdot \tau^*_{k-1} + r_t \quad \text{(eq. 12)}$$

In eq. 12, a, b and $r_t$ are as follows.

[math. 3]

$$a = -\frac{(J^*_n/\delta t)}{(J^*_n/\delta t) + D^*_n} \quad \text{(eq. 13)}$$

$$b = \frac{1}{(J^*_n/\delta t) + D^*_n} \quad \text{(eq. 14)}$$

$$r_t = \frac{1}{(J^*_n/\delta t) + D^*_n} \cdot v_t \quad \text{(eq. 15)}$$

Eq. 12 is reexpressed into eq. 16.

[math. 4]

$$y_t = z_t^T \cdot \theta + r_t \quad \text{(eq. 16)}$$

The correspondence between the respective symbols in eq. 16 and eq. 12 is as follows.

[math. 5]

$$y_t = \omega_t \quad \text{(eq. 17)}$$

$$z_t^T = [\omega_{t-1} \ \tau_{t-1}^*] \quad \text{(eq. 18)}$$

$$\theta = \begin{bmatrix} a \\ b \end{bmatrix} \quad \text{(eq. 19)}$$

By applying eq. 16 to eq. 19 above to, for example, eqs. (a-1) to (a-4) below to serve as a base algorithm, one is able to apply the "parameter identification technique" to the "torque sensorless technique". Note that the process for deriving eqs. (a-1) to (a-4) below will be described as "derivation of sequential least squares algorithm", following the embodiments.

Sequential Least Squares Algorithm

The inventors believe that the following order provides for the most efficient calculation. However, the following order is not limiting. Note that the time of sampling K is based on increments of 1.

[math. 6]

$$P_K \cdot z_K = \frac{P_{K-1} \cdot z_k}{1 \mid z_K^T \cdot P_{K-1} \cdot z_K} \quad \text{(a-1)}$$

$$\varepsilon_K = (y_K - z_K^T \cdot \hat{\theta}_{K-1}) \quad \text{(a-2)}$$

$$\hat{\theta}_K = \hat{\theta}_{K-1} + P_K \cdot z_K \cdot \varepsilon_K \quad \text{(a-3)}$$

$$P_K = P_{K-1} - \frac{P_{K-1} \cdot z_K \cdot z_K^T \cdot P_{K-1}}{1 + z_K^T \cdot P_{K-1} \cdot z_K} \quad \text{(a-4)}$$

The above sequential least squares algorithm requires two initial values $\hat{\theta}_0$ and $P_0$ ($P_0$ may be such that not all elements are zero; a $P_0$ such that all elements are 0 would disallow a sequential correction operation to work for the parameters). Design guidelines for the initial values will be described later.

As is clear from eqs. (a-1) to (a-4), in order to derive current parameters, their immediately previous values ($P_{K-1}$, $\hat{\theta}_{K-1}$) may be retained. In other words, the storage area in the RAM 22 to be utilized by the microprocessor 20 in performing computations can be reduced.

In the above equations, $\hat{\theta}_K$ includes parameters a and b that identify the system (see eq. 19), and, in turn, parameters a and b include an estimated value $J^*_n$ of moment of inertia and an estimated value $D^*_n$ of viscous drag coefficient of the bicycle mechanism (see eq. 13 and eq. 14). Therefore, by determining $\hat{\theta}_K$ through sequential calculations, estimated values $J^*_n$ and $D^*_n$ can be determined as follows. It is supposed that $\hat{\theta}_K = [a_k \ b_k]^{-1}$.

$$J^*_n = (-1) \cdot \delta t \cdot a_k / b_k \quad \text{(a-5)}$$

$$D^*_n = (a_k + 1) / b_k \quad \text{(a-6)}$$

Through the above process, parameter estimated values $J^*_n$ and $D^*_n$ can be updated. By repeating the above process, it is possible to reduce an error between: an estimated value of rotational speed of the motor as determined from the total torque estimated value $\tau^*_M + \tau^*_H - \tau^*_L$ that is based on a transfer function which is defined by these parameters; and a detected value of rotational speed of the motor.

As a variation of the sequential least squares method, the "supplementary variable method", the "forgetting method", and "methods combining both" may be utilized. Since these are well-known, their derivation procedures will be omitted. Note that the "forgetting method" is not a method which is aimed at cancel out the bias error that the least-squares method possesses. However, it is a particularly effective method in the case where the linear system to be identified is actually not a time-invariant linear system, but a time-variant linear system. Therefore, any method that combines the "supplementary variable method" and the "forgetting method" may also be considered as an effective method.

Next, design guidelines for the two initial values $\hat{\theta}_0$ and $P_0$ that are required for the "parameter identification technique" algorithm are illustrated.

Design Guidelines for Initial Value $\hat{\theta}_0$

The physical meanings of $\hat{\theta}_K$, which is an output of the "parameter identification technique", or $\hat{\theta}_0$, which is an initial value thereof, are indicated by eq. 13 and eq. 14, and three design factors $J^*n$, $D^*_n$ and $\delta_t$ are quantities whose appropriate initial values can be taken for granted.

Design Guidelines for Initial Value $P_0$

The physical meaning of $P_K$ is indicated by formula (13) in the "derivation of sequential least squares algorithm" to be described later. Let an initial value of $P_K$, which is an inverse matrix, be $P_0$. Functionally, the initial value $P_0$ or the value $P_K$ being large or small serves as a correction gain for $\hat{\theta}_K$, as is described in the description following formula (28) in the "derivation of sequential least squares algorithm". Therefore, qualitatively, a $P_K$ with a large value tends toward a faster sequential correction operation and a larger amount of correction, while a $P_K$ with a small value tends toward a slower sequential correction operation and a smaller amount of correction.

When the usual use conditions of an electrically assisted bicycle are considered, it is believed that there is no need for considerable correction using the correction gain $P_K$ so long as the initial value $\hat{\theta}_0$ is appropriately set. For this reason, a $P_0$ with a small value is considered desirable. It may be set through a theoretical study, e.g., simulations, and checked for its validity through actual machine tests. In addition to the above, the following two points will also be taken into consideration: a $P_0$ such that all elements are 0 would disallow a sequential correction operation to work for the parameters; and, there being a feedback structure, a phenomenon may occur where the estimation result $\hat{\theta}_K$ oscillates, depending on the magnitude of the correction gain.

Second Example

Next, an example where the torque generator in Block C in FIG. 3 utilizes another torque as the torque to be input to the blocks $(1/J^*_n \cdot s + D^*_n)$ and $(1/J \cdot s + D)$. As used herein, another torque is meant to be anything other than an estimated total torque as determined in Block B.

The torque generator is able to utilize any of the following torque values as the input to the aforementioned blocks, for example.

(1) estimated value $(\tau^*_M - \tau^*_L)$
(2) command value $\tau_M$
(3) predetermined $\tau$(=predetermined $\tau_M$− expected $\tau_L$)

These all presume that parameter identification is to be performed in a situation where no human torque (pedal torque)$\tau_H$ has occurred.

The above (1) corresponds to a situation where pedal torque no longer needs to be factored in. For example, let us say that when power assistance is at work while the bicycle operator is pedaling, the bicycle operator suddenly stops pedaling, at a certain moment. At this point, although the pedals are not moving (i.e., there is no pedal torque), a self-propelling state exists, where there is no need to factor in the pedal torque. Being "self-propelled" means the electrically assisted bicycle 1 traveling only by virtue of the driving power from the motor. The torque generator sets an estimated value $(\tau^*_M - \tau^*_L)$ as an input to the blocks $(1/J^*_n \cdot s + D^*_n)$ and $(1/J \cdot s + D)$. The microprocessor 20 performs parameter identification by using the estimated value $(\tau^*_M - \tau^*_L)$.

The above example (2) presumes a situation where parameter identification is to be performed in a situation where travel load presumably never occurs. For example, a situation may be presumed where, on a flat and windless road, the electrically assisted bicycle 1 is being self-propelled at a velocity such that the load resistance torques (i.e., aerodynamic resistance torque and slope resistance torque (including frictional force torque)) are ignorable, without any pedaling by the bicycle operator. The microprocessor 20 determines parameters $J^*_n$ and $D^*_n$ under this situation.

The above example (3) presumes that parameter identification is to be performed when entering a self-propelled state in a situation where no power assistance is being provided. For example, let us say that the electrically assisted bicycle 1 includes an electric throttle, and a mere manipulation of the electric throttle activates a self-propelling function. While the electrically assisted bicycle 1 is traveling through manipulation of the electric throttle, without any pedaling by the bicycle operator, the motor torque is adjusted in terms of the opening angle of the electric throttle. In other words, a predetermined motor torque $\tau_M$ which is in accordance with the opening angle of the electric throttle is generated. The microprocessor 20 performs parameter identification by using the predetermined motor torque $\tau_M$ and the expected travel load torque $\tau_L$. In another instance, the above example (3) is also applicable to an electric trolley or the like in which an electric throttle or a similar driving power manipulating mechanism is provided.

In FIG. 3, an actual model $(1/J \cdot s + D)$ of the dynamics of the bicycle mechanism in Block A and the estimated model $(1/J^*_n \cdot s + D^*_n)$ in Block C of FIG. 3 are counterparts. In the present embodiment, since the bicycle mechanism lacks a torque sensor, it is impossible to identify an input torque to the actual model $(1/J \cdot s + D)$. Therefore, instead of the actual torque to be input to $(1/J \cdot s + D)$, a torque which is determined by the torque generator is used.

As will be understood from the above examples (1) to (3), the input to $(1/J \cdot s + D)$ and $(1/J^*_n \cdot s + D^*_n)$ may be an estimated value, an actual command value, or a previously determined value. In the specification, these are collectively referred to as "predetermined values". As is clear from eqs. 5 to 7 and eq. 10 above, even if an estimated value $(\tau^*_M + \tau^*_H - \tau^*_L)$ of total torque is replaced by the value of another torque, all of eqs. 5 to 19 and eqs. (a-1) to (a-6) hold true. In other words, by using a given torque as determined by the torque generator, parameters $J^*_n$ and $D^*_n$ can be sequentially updated.

In the above (1) to (3), parameter identification is to be performed in a situation where no human torque (pedal torque)$\tau_H$ occurs. Parameters which are free from human torque influences (in particular, parameters that are identified in a situation which are also free from travel load torque influences, e.g., (2)) can be regarded as having high reliability or accuracy. After determining such highly accurate parameters, if the parameters are updated while traveling on poor terrain or the like, parameters with all the lower accuracy might result. Therefore, in one instance, the parameters may be updated when the microprocessor 20 determines that situations as represented by the above (1) to (3) are satisfied.

D. Power Assist Technique

Based on the human torque estimated value $\tau^*_H$ which has been described by the "B. torque sensorless technique" described above, the microprocessor 20 determines a driving power (also referred to as an "assist amount") of the motor 30.

For example, a relationship between the estimated value $\tau^*_H$ of human torque and the motor torque $\tau_M$ corresponding to the assist amount may be defined in advance as a mathematical function $\tau_M = f(\tau^*H)$, or a relationship between the estimated value $\tau^*_H$ of human torque and the motor torque $\tau_M$ may be retained in a table.

Furthermore, conditions other than the estimated value $\tau^*_H$ of human torque may be accounted for. For example, a mathematical function or table may be provided which, in addition to the estimated value $\tau^*_H$ of human torque, also factors in a detected value $\omega$ of velocity of travel. In the case where an estimated value $\tau^*_H$ of human torque happens to be not described in the table, for example, the two closest torque values existing before and after the calculated estimated value $\tau^*_H$ of human torque may be extracted from the table, and the motor torque $\tau_M$ values corresponding to these torque values may be further extracted, and a motor torque $\tau_M$ may be calculated therefrom by interpolation technique.

Figure 5:
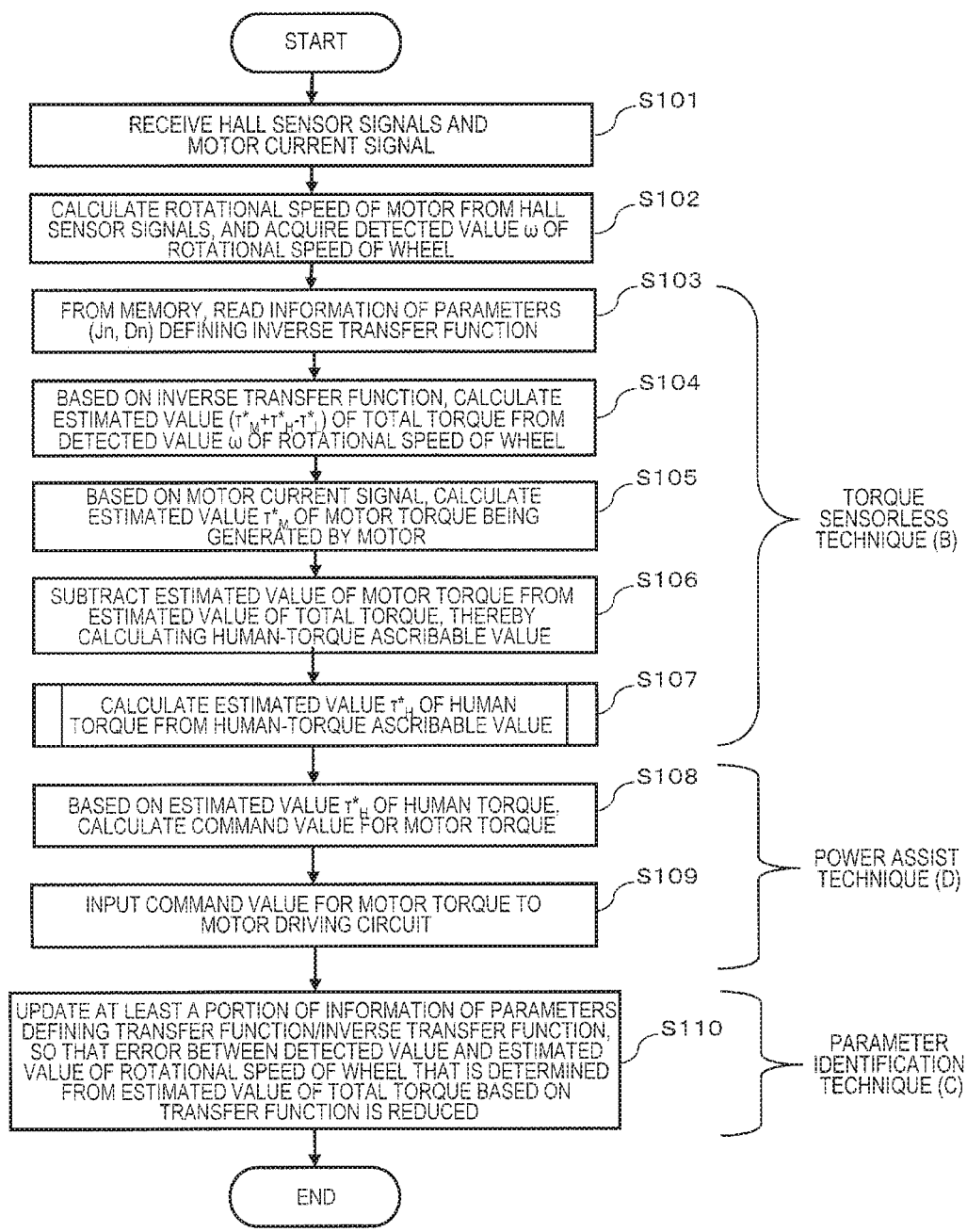
FIG. 5 is a flowchart showing an operational procedure of a microprocessor 20.

FIG. 5 is a flowchart showing an operational procedure of the microprocessor 20. Steps S103 to S107 correspond to the aforementioned "B. torque sensorless technique". Steps S108 and S109 correspond to the "D. power assist technique", and step S110 corresponds to the "C. parameter identification technique".

At step S101, the microprocessor 20 receives Hall sensor signals which are output from the Hall sensors 30*a* to 30*c*. Also, the microprocessor 20 receives a motor current signal from the motor driving circuit 25.

At step S102, the microprocessor 20 calculates a rotational speed of the motor from the Hall sensor signals, and by e.g. multiplying it with a predetermined coefficient, acquires a detected value $\omega$ of rotational speed of the wheel.

At step S103, from the RAM 22, the microprocessor 20 reads parameters $(J_n, D_n)$ defining the inverse transfer function. Parameters 23*b* defining initial values may be set according to the aforementioned design guidelines. Moreover, if step S110 described below has been once executed, the microprocessor 20 reads the updated, latest parameters $(J_n, D_n)$ from the RAM 22.

At step S104, based on the inverse transfer function, the microprocessor 20 calculates an estimated value $(\tau_M + \tau_H - \tau_L)$ of total torque from the detected value $\omega$ of rotational speed of the wheel.

At step S105, based on the motor current signal, the microprocessor 20 calculates an estimated value $\tau^*_M$ of motor torque that is being generated by the motor.

At step S106, the microprocessor 20 subtracts the estimated value of motor torque from the estimated value of total torque, thereby calculating a human-torque ascribable value.

At step S107, the microprocessor 20 calculates an estimated value $\tau^*_H$ of human torque from the human-torque ascribable value. An example of this process may be subtracting a travel load torque $\tau^*_L$ from the human-torque ascribable value. Details of this process will be described later with reference to FIG. 6.

In the case where the travel load torque $\tau^*_L$ is not factored in, this process is not particularly needed, and the human-torque ascribable value may itself be treated as the estimated value $\tau^*_H$ of human torque. However, in terms of computation processing, any process that does not straightforwardly employ the human-torque ascribable value, e.g., involving some conversion, is encompassed within step S107.

At step S108, the microprocessor 20 calculates a command value for motor torque based on the estimated value $\tau^*_H$ of human torque. The microprocessor 20 has a table (not shown) that maps estimated values $\tau^*_H$ of human torque to command values for motor torque, for example. By referring to the table for the resultant estimated value $\tau^*_H$ of human torque, a command value for motor torque can be identified.

At step S109, the microprocessor 20 inputs the command value for motor torque as a PWM signal to the motor driving circuit.

At step S110, the microprocessor 20 updates at least a portion of information of the parameters defining the transfer function/inverse transfer function, so that the error between the detected value and an estimated value of rotational speed of the wheel that is determined from the estimated value of total torque based on the transfer function is reduced. The process of step S110 means that the microprocessor 20 executes eq. (a-1) to eq. (a-4) above, or eq. (a-5) and eq. (a-6) above, specifically. The microprocessor 20 stores the parameters which have been obtained through the process to the RAM 22 as new parameters ($J_n$, $D_n$).

Although FIG. 5 illustrates that the step of parameter identification technique (C) is performed after the steps of torque sensorless technique (B) and power assist technique (D), the present disclosure is not limited to this order. For example, the steps of torque sensorless technique (B) and power assist technique (D) may be performed after the step of parameter identification technique (C).

Figure 6:
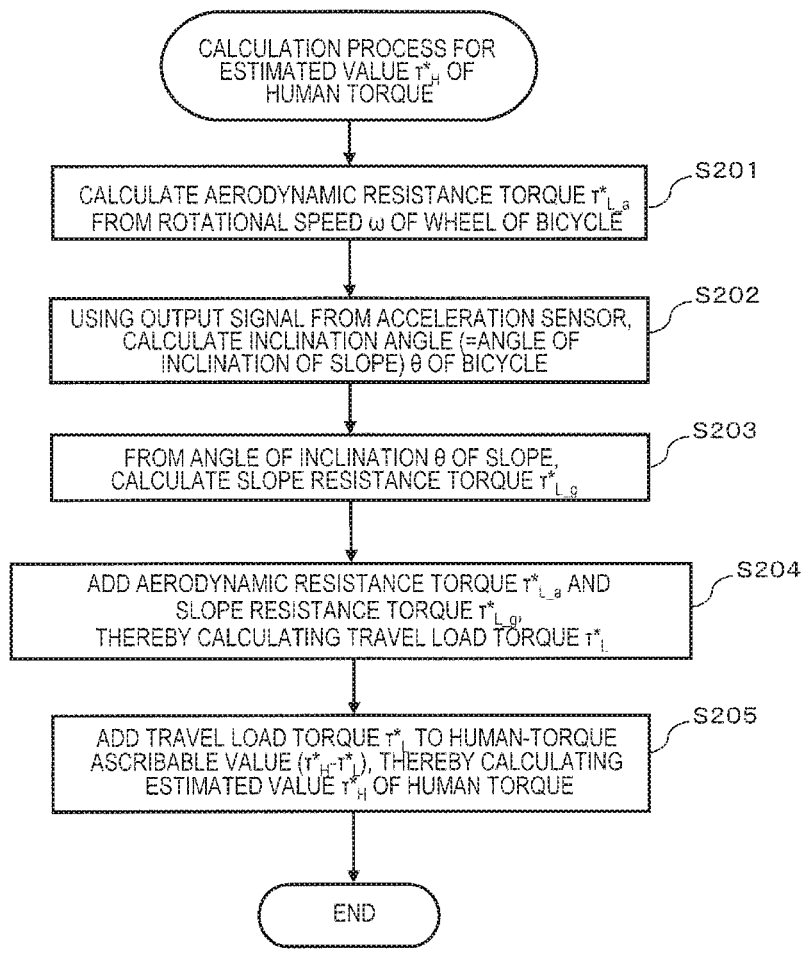
FIG. 6 is a flowchart showing a procedure of processing, including a travel load torque calculation process.

FIG. 6 is a flowchart showing a procedure of processing, including a travel load torque calculation process, as an example of step S107 in FIG. 5. As described above, in order to determine the estimated value $\tau^*_H$ of human torque more accurately, it is more preferable to factor in the travel load torque. Steps S201 to 204 in FIG. 6 are a process of calculating the travel load torque.

At step S201, as indicated in eq. 1, the microprocessor 20 calculates an aerodynamic resistance torque $\tau^*_{L\_a}$ from the rotational speed ω of the wheel of the bicycle.

At step S202, the microprocessor 20 calculates an inclination angle of the bicycle (=angle of inclination of the slope) θ from the acceleration sensor.

At step S203, the microprocessor 20 calculates a slope resistance torque $\tau^*_{L\_g}$ from the angle of inclination θ of the slope. As described above, the slope resistance torque $\tau^*_{L\_g}$ is a sum total of a load resistance torque estimated value that occurs due to friction and a load resistance torque estimated value which is ascribable to a gravity component.

At step S204, the microprocessor 20 adds the aerodynamic resistance torque $\tau^*_{L\_a}$ and the slope resistance torque $\tau^*_{L\_g}$, thereby calculating a travel load torque $\tau^*_L$.

At step S205, the microprocessor 20 adds the travel load torque $\tau^*_L$ to the human-torque ascribable value ($\tau_H - \tau_L$), thereby calculating an estimated value $\tau^*_H$ of human torque.

Note that step S204 can be omitted. The microprocessor 20 may calculate an estimated value $\tau^*_H$ of human torque by subtracting the aerodynamic resistance torque $\tau^*_{L\_a}$ and slope resistance torque $\tau^*_{L\_g}$ from the human-torque ascribable value.

As the aforementioned process of FIG. 5 and FIG. 6 is executed once, the parameters of the transfer function and the inverse transfer function are updated once.

Embodiment 2

Figure 7:
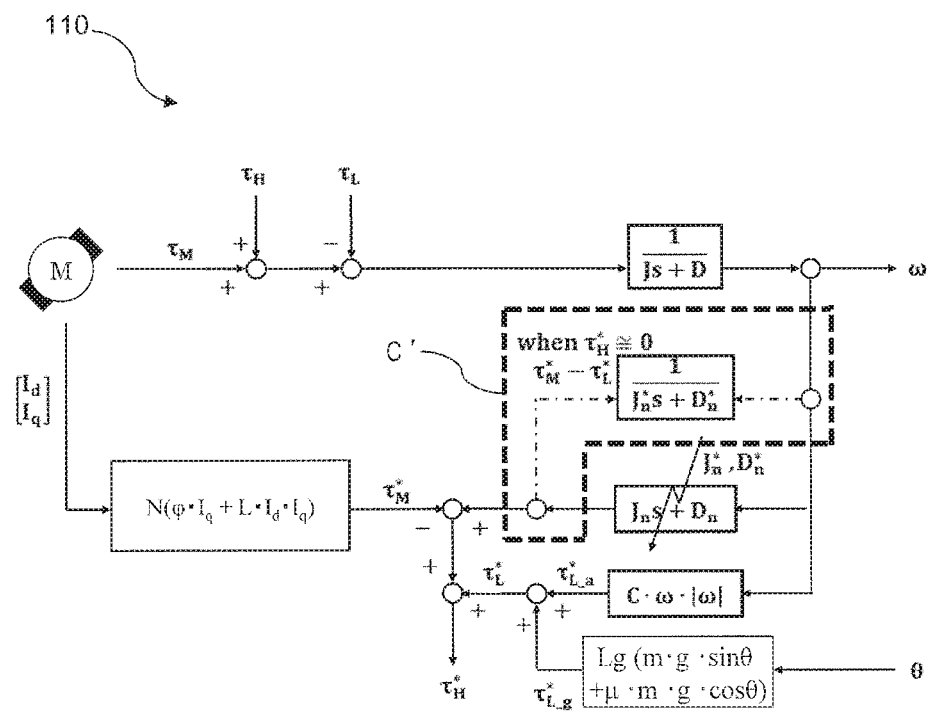
FIG. 7 is a block diagram representing a power assist device 110.

FIG. 7 is a block diagram representing a power assist device 110 which is a dynamic system according to the present embodiment.

The power assist device 110 differs from the power assist device 100 (FIG. 3) with respect to the timing with which the parameter identification technique is performed. In FIG. 7, it corresponds to "C'" in a broken-line box. Specifically, the microprocessor of the power assist device 110 performs the parameter identification technique C' only when an estimated value $\tau^*_H$ of pedal torque is regarded as zero, thereby determining estimated values of $J^*_n$ and $D^*_n$. As compared to Block C in FIG. 3, no torque generator exists in Block C' of FIG. 7. However, the aforementioned case of the estimated value $\tau^*_H$ being regarded as zero is synonymous to (1) of the second example in the parameter identification technique C described in Embodiment 1. Therefore, this is substantially synonymous to providing a torque generator and updating $J_n$ and $D_n$ by using an estimated value ($\tau^*_M - \tau^*_L$).

The estimated value $\tau^*_H$ of pedal torque is a value which is obtained through rounds of various estimation calculations. Therefore, it can be said to be a value of the lowest reliability among the estimated values shown in FIG. 2. Therefore, if parameters $J_n$ and $D_n$ can be determined without using an estimated value $\tau^*_H$ of pedal torque, their reliability can be improved.

The inventors have decided that a process of determining parameters $J_n$ and $D_n$ shall be performed when the estimated value $\tau^*_H$ of pedal torque is regarded as zero, thus determining more accurate parameters $J_n$ and $D_n$. Hereinafter, this will be specifically described. The hardware construction is as shown in FIG. 2. Therefore, in the following description, too, the operation according to the present embodiment will be described as processing by the microprocessor 20.

Figure 8:
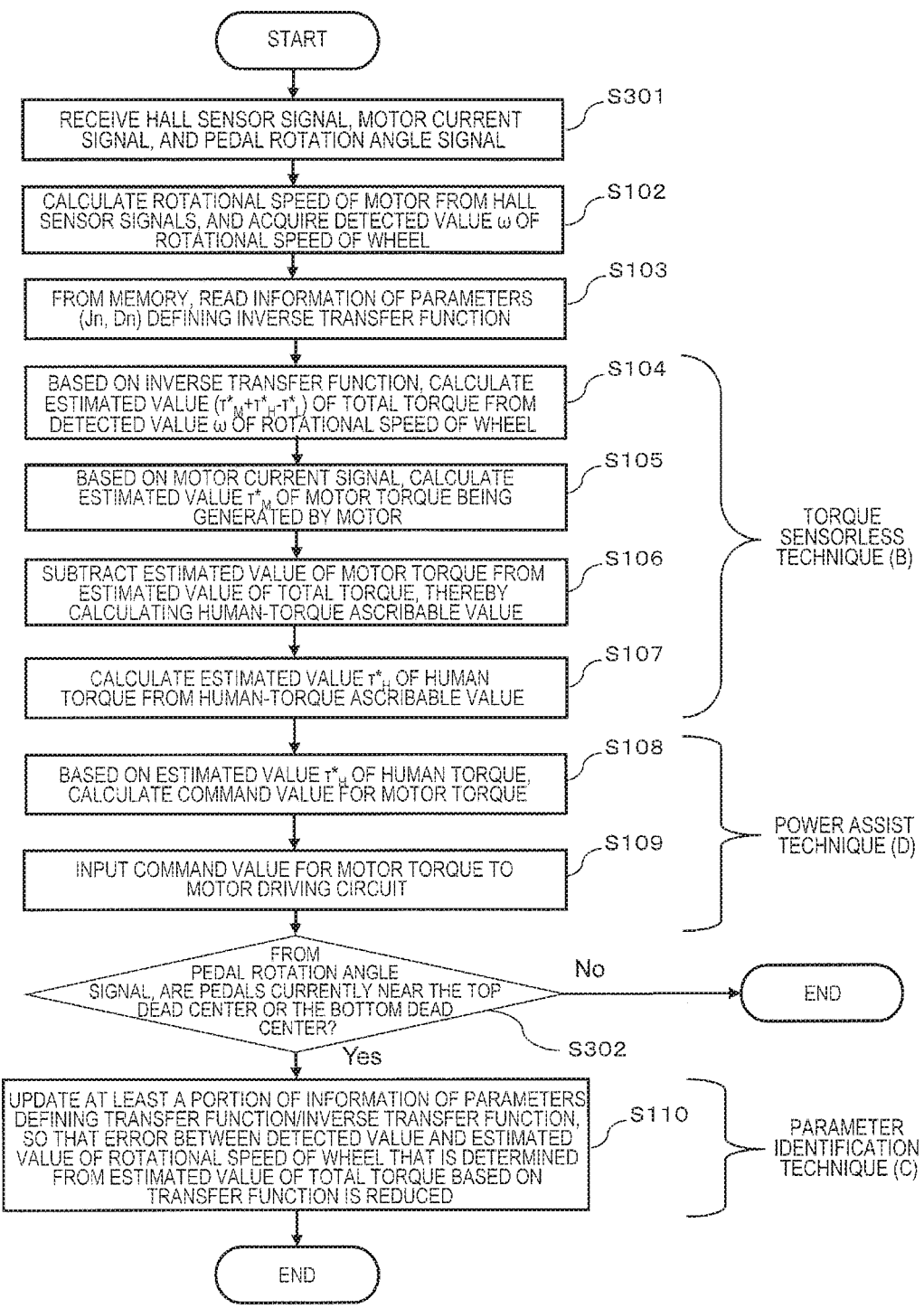
FIG. 8 is a flowchart showing an operational procedure of the microprocessor 20 of the power assist device 110.

FIG. 8 is a flowchart showing an operational procedure by the microprocessor 20 of the power assist device 110. Differences between FIG. 8 and FIG. 5 are steps S301 and S302.

At step S301, the microprocessor 20 receives from the pedal angle sensor 27 a pedal rotation angle signal, which is a signal representing angles of rotation of the pedals 16 (FIG. 1). The pedal angle sensor 27 according to the present embodiment may have any construction so long as it is at least capable of outputting a signal (e.g. an angle signal) which can identify the positions of the pedals 16 being at the top dead center or the bottom dead center, or in the vicinities thereof. The angle signal may go e.g. High in synchronization with a moment that the pedals 16 become located at the top dead center or the bottom dead center, or in the vicinities thereof. In the specification, such a moment may be expressed as "when the angle signal indicates top dead center or bottom dead center angles of the pedals".

As the pedal angle sensor 27, a known magnetic rotary encoder may be used, for example. With a rotating disk or drum having a magnetic pattern formed thereon, a magnetic rotary encoder captures rotary position information as periodic changes in the magnetic field. The top dead center and the bottom dead center can be identified as rotary position information of the pedals. Alternatively, by using a magnet or the like, the pedal angle sensor 27 may output a High signal upon detecting that the pedals 16 have passed specific positions (angles), and otherwise output a Low signal.

Step S302 defines a condition under which step S110 of performing the parameter identification technique may be executed. Specifically, from the pedal rotation angle signal, the microprocessor 20 determines whether or not the pedals 16 are currently near the top dead center or the bottom dead center. If the pedals 16 are near the top dead center or the bottom dead center, the process proceeds to step S110; otherwise, the process is ended.

The pedals 16 being located in the top dead center or the bottom dead center or the vicinities thereof means that the human torque from the bicycle operator that is applied to the pedals 16 at that time is substantially zero. In other words, at this moment, the estimated value $\tau^*_H$ of pedal torque can be regarded as zero. The inventors have decided that, in synchronization with the moment that the pedals 16 arrive at the top dead center or the bottom dead center or the vicinities thereof, the process shown in FIG. 5 and FIG. 6 is performed to update parameters $J_n$ and $D_n$, thereby enhancing computation accuracy.

The period during which the pedals 16 pass the top dead center and the bottom dead center would only be momentary to the bicycle operator. However, the microprocessor 20 is able to perform the process shown in FIG. 5 and FIG. 6 in every several hundred microseconds. Therefore, safely within the period during which the top dead center and the bottom dead center are passed, the microprocessor 20 is able to perform the process. Therefore, it is possible for the microprocessor 20 to update parameters $J_n$ and $D_n$ at the moment that the pedals 16 arrive at the top dead center and the bottom dead center. According to the processing of the present embodiment, parameters $J_n$ and $D_n$ are updated twice per turn of pedal cranks. As compared to the processing of Embodiment 1, the frequency of updating is much lower. However, so long as parameters $J_n$ and $D_n$ are updated once in every half turn of the pedal cranks, it is considered that changes in the traveling environment will be followed sufficiently rapidly in practice.

Figure 9:
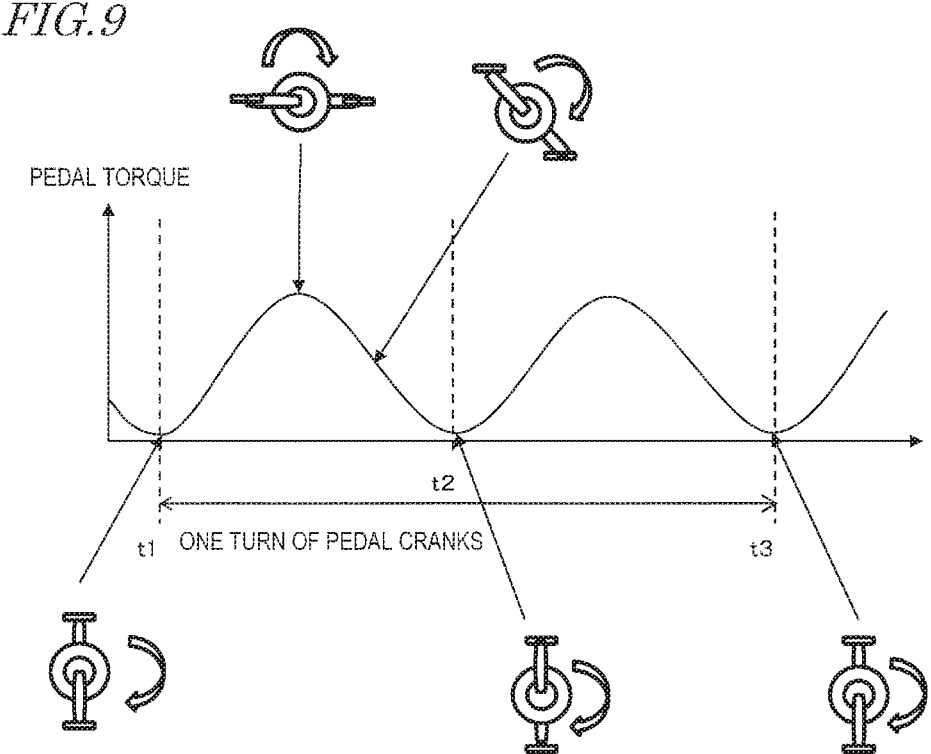
FIG. 9 is a diagram showing a relationship between the positions (angles) of pedals 16 and pedal torque.

FIG. 9 shows a relationship between the positions (angles) of pedals 16 and pedal torque. Times t1, t2 and t3 respectively correspond to the bottom dead center, the top dead center, and the bottom dead center of the frontward pedal 16 shown in the figure. For the rearward pedal shown in the figure, conversely, times t1, t2 and t3 respectively correspond to the top dead center, the bottom dead center, and the top dead center. It can be seen from the graph that the pedal torque at times t1, t2 and t3 is the smallest, i.e., substantially 0. At times t1, t2 and t3, or at any one or two points in time among these, the microprocessor 20 executes step S110 in FIG. 8 to determine parameters $J_n$ and $D_n$. Since the lowest-reliability estimated value $\tau^*_H$ of pedal torque does not need to be used as an input signal to the parameter identification technique, improvement in the reliability of the entire system is expected.

Figure 10:
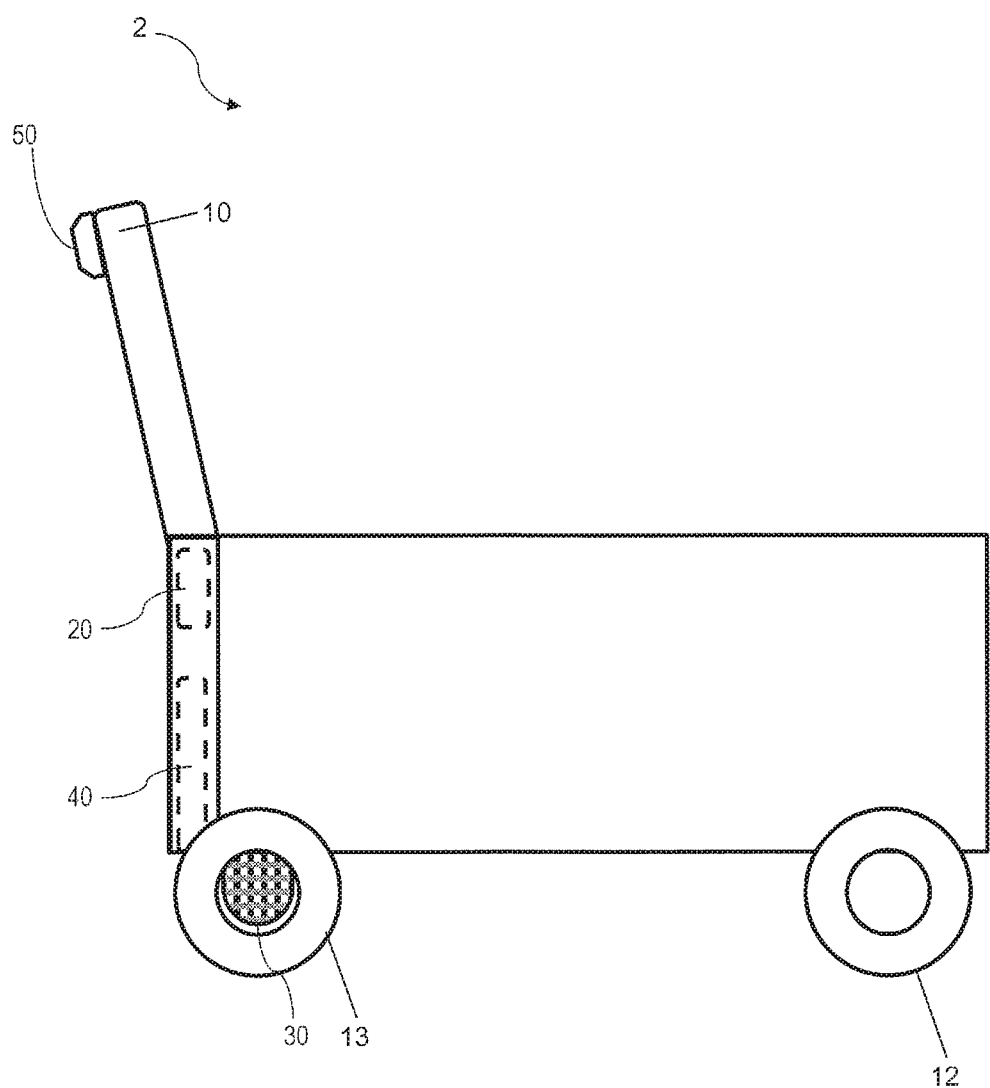
FIG. 10 is a side view of an electric trolley 2, as another illustrative embodiment of the present disclosure.

FIG. 10 shows a side view of the electric trolley 2, as another illustrative embodiment of the present disclosure. The electric trolley 2 is also referred to as an electric cart. Similarly to the electrically assisted bicycle 1, the electric trolley 2 also includes a handle bar (grip) 10, the microprocessor 20, a motor 30, and a battery 40. Moreover, the electric trolley 2 has four wheels. The motor 30 is mechanically connected to two rear wheels 13.

A detector 50 that detects whether a human force is being applied to the grip or not is provided on the handle bar (grip) 10 of the electric trolley 2. For example, the detector 50 may be a pressure switch of a contact detection type that activates upon application of a certain pressure, or a diaphragm gauge (pressure sensor) of a capacitance type/distortion detection type. Alternatively, it may be a sensor incorporating a piezoelectric element. While the detector 50 is detecting a human force, the microprocessor 20 drives the motor 30. As a result, the electric trolley 2 moves by virtue of the human force that is input via the grip, and the driving power of the motor 30.

The torque of a human force which is input via the grip corresponds to a human torque (pedal torque) of the electrically assisted bicycle 1 in Embodiments 1 and 2. Therefore, the description concerning Embodiments 1 and 2 would apply to the electric trolley 2 except that in the operations of Embodiments 1 and 2 the human torque (pedal torque) should read as the torque of a human force which is input via the grip. However, in the case of adopting the process of FIG. 8 in Embodiment 2 above, the timing of updating parameters $J_n$ and $D_n$ may be altered as follows. In Embodiment 2, when the pedals 16 are located near the top dead center or the bottom dead center, parameters $J_n$ and $D_n$ are updated by regarding the estimated value $\tau^*_H$ of pedal torque as zero. In the electric trolley 2, while the detector 50 is not detecting a human force, there is zero human torque. Therefore, in performing the process of FIG. 8, the microprocessor 20 of the electric trolley 2 of FIG. 10 may execute step S110 while the detector 50 is not detecting any human force.

Other than the aforementioned electric trolley 2, Embodiments 1 and 2 above are also applicable to an electrically assisted wheelchair which assists the rider of a wheelchair or the helper of a wheelchair with a motor.

In the above-described embodiment, an electrically assisted vehicle lacking a torque sensor was illustrated as an example. However, the present disclosure is also applicable to an electrically assisted vehicle having a torque sensor. In other words, regardless of whether a torque sensor is provided or not, the present disclosure is applicable to any electrically assisted vehicle that moves with a driving power based on a human force and a driving power based on a motor.

For example, let us say that the microprocessor 20 is receiving from the torque sensor a torque detection signal which is in accordance with the human torque. Based on the torque detection signal, the microprocessor 20 determines a command value for motor torque, and performs a process (referred to as "Process A") of inputting the command value for motor torque to the motor driving circuit. Then, when a torque detection signal is not available due to malfunctioning of the torque sensor, etc., the microprocessor 20 may perform the aforementioned human torque estimation process (referred to as "Process B") to calculate a human torque. In other words, the microprocessor 20 is able to selectively perform one of Process A and Process B. Alternatively, the microprocessor 20 may perform both of Process A and Process B. For example, the microprocessor 20 may verify the result from Process A by using an estimation result by Process B. If the error is within a previously determined range, the estimation result by Process A is correct; if the range is exceeded, the same process may be performed again. The reason is that, in the latter case, the estimation result by Process A may possibly be incorrect.

Alternatively, the microprocessor 20 may perform the aforementioned Process B according to a previously determined time constraint. An exemplary time constraint is when activating the electrically assisted bicycle for the first time, for example. Human torque estimation may be performed upon activation for the first time, and an offset may be added to the output value from the torque sensor so that the output value of the torque sensor will match the estimation result of human torque. As a result, individual differences among torque sensors can be absorbed. Another example of the time constraint may be lapse of a certain time, e.g., one year. If a predetermined value of difference or greater exists between the output value from the torque sensor and the estimation result of human torque, the bicycle operator may be alarmed of the need to check, or malfunctioning of, the torque sensor.

In another example, the present disclosure is also applicable to an electrically assisted bicycle which includes a cadence sensor instead of a torque sensor, and which assists a bicycle operator with a motor by utilizing an output of the cadence sensor. In still another example, the present disclosure is also applicable to an electrically assisted bicycle which includes both of pedals for human force application and an electric throttle. In an electrically assisted bicycle in which manipulation of the electric throttle while the bicycle operator is pedaling is deemed valid so as to allow an assist with the motor to be performed, a human torque may be estimated according to the aforementioned process of the present disclosure, and information of the opening angle of the electric throttle may be further accounted for in determining a driving power for the motor. For example, through the above-described processing of the present disclosure, a driving power for the motor may be determined which is in accordance with the estimated human torque, and an additional driving power for the motor may be further provided depending on the opening angle of the electric throttle.

Based on the above, an illustrative embodiment of the present disclosure is used for the power assist device 100 of a vehicle 1 which includes wheels 12 and 13 and which is driven with a human force. The power assist device 100 includes a motor 30, a motor driving circuit 25, sensors 30a to 30c to output signals which are in accordance with the rotational speed of the wheels 12 and 13, a memory 22, and a signal processor 20. The motor 30 generates a motor torque. The motor driving circuit 25 supplies electric power to the motor. The memory 22 stores information of parameters 24b defining a transfer function that interrelates a total torque which is input to the vehicle 1 and the rotational speed of the wheels 12 and 13, and an inverse transfer function thereof. The signal processor 20 is connected to the memory 22 and the motor driving circuit 25.

Herein, the signal processor 20 receives signals which are output from the sensors 30a to 30c, and determines a detected value of rotational speed of the wheels 12 and 13. Moreover, the signal processor 20 reads information of the parameters 24b from the memory 22. Based on the inverse transfer function that is defined by the parameters 24b, the signal processor 20 determines an estimated value of total torque from the detected value of rotational speed of the wheels 12 and 13. Furthermore, the signal processor 20 acquires information indicating the operating state of the motor 30, and based on this information, determines an estimated value of motor torque that is being generated by the motor 30. Based on a value obtained by subtracting the estimated value of motor torque from the estimated value of total torque, the signal processor 20 determines an estimated value of human torque. Based on the estimated value of human torque, the signal processor 20 determines a command value for motor torque. Moreover, the signal processor 20 inputs the command value for motor torque to the motor driving circuit 25. The signal processor 20 updates at least a portion of the information of the parameters 24b stored in the memory 22 so that the error between the detected value of rotational speed of the wheels 12 and 13 and the estimated value of rotational speed of the wheels 12 and 13 determined from a given torque value based on the transfer function that is defined by the parameters 24b is reduced.

Moreover, in an illustrative embodiment of the present disclosure, the given torque value for the power assist device 100 may be an estimated value of total torque. With this construction, a value of motor torque for assistance can be determined for a given torque as determined by the torque generator.

Moreover, in an illustrative embodiment of the present disclosure, the power assist device 100 adopts a sequential least squares algorithm. With the sequential least squares algorithm, the signal processor 20 minimizes the error between the detected value of rotational speed of the wheels 12 and 13 and the estimated value of rotational speed of the wheels 12 and 13, and updates at least a portion of the information of the parameters 24b stored in the memory 22. With this construction, the signal processor 20 is able to identify fluctuating parameters, thus improving the accuracy of pedal torque estimation.

In an illustrative embodiment of the present disclosure, the transfer function defined by the parameters 24b is a transfer function of a linear first order lag system. With this construction, the power assist device 100 can be a device that is suited for the bicycle mechanism.

In an illustrative embodiment of the present disclosure, a time constant(s) of the transfer function of the linear first order lag system is determined based on a moment of inertia and a viscous drag coefficient. With this construction, the power assist device 100 can be a device that accounts for a moment of inertia and a viscous drag coefficient, which are parameters of the dynamic characteristics possessed by the bicycle mechanism.

In an illustrative embodiment of the present disclosure, the signal processor 20 performs a process of updating at least a portion of the information of the parameters 24b stored in the memory 22 while substantially no human torque is applied. To say that substantially no human torque is applied, it is preferable that the human torque value is as close to zero as possible. With this construction, the computation accuracy for the parameters 24b can be enhanced.

In an illustrative embodiment of the present disclosure, the vehicle 1 includes pedals, and is driven with a human force which is input via the pedals. The power assist device 100 further includes a pedal angle sensor to output an angle signal which is in accordance with the angle of the pedals. The signal processor 20 performs a process of updating at least a portion of the information of the parameters 24b stored in the memory 22 when the angle signal which is output from the pedal angle sensor indicates top dead center or bottom dead center angles of the pedals, or when no human torque is being generated on the basis of an angle signal which is output from the pedal angle sensor. To say that no human torque is being generated, it is preferable that the human torque value is as close to zero as possible. With this construction, when parameters are to be acquired in the bicycle mechanism, the parameters can be computed more accurately.

In an illustrative embodiment of the present disclosure, the vehicle may include a grip, and be driven with a human force which is input via the grip. The power assist device further includes a detector to detect whether a human force is being applied to the grip or not. The signal processor performs a process of updating at least a portion of the information of the parameters 24b stored in the memory 22 when the detector detects that a human force is not being applied to the grip. With this construction, the power assist device can be a device which is better suited for the electric trolley 2.

In an illustrative embodiment of the present disclosure, the power assist device further includes an inclination angle sensor to output a signal which is in accordance with an acceleration or an angle of inclination of the road surface. Before the computation process of an estimated value of human torque, the signal processor determines an estimated value of angle of inclination of the road surface based on the signal which is output from the inclination angle sensor, and estimates a slope resistance torque from the estimated value of angle of inclination. After this process, the signal processor estimates an aerodynamic resistance torque which is proportional to a square of the detected value of rotational speed of the wheel. In the computation process of an estimated human torque, the signal processor may determine an estimated value of human torque based on a value which is obtained by subtracting the estimated value of motor torque from the estimated value of total torque and adding up the slope resistance torque and the aerodynamic resistance torque. With this construction, the power assist device is able to determine an assisting force for the human torque by better accounting for the load during travel.

In an illustrative embodiment of the present disclosure, the inclination angle sensor may be an acceleration sensor. The signal processor performs a process of estimating a slope resistance torque by integrating a signal which is output from the acceleration sensor over a predetermined time slot. With this construction, the signal processor is able to estimate an angle of inclination of the road surface with increased accuracy by using an acceleration sensor.

In an illustrative embodiment of the present disclosure, the power assist device further includes a torque sensor to output a torque detection signal which is in accordance with the human torque. The signal processor performs a process of determining a command value for motor torque based on the torque detection signal, and inputting the command value for motor torque to the motor driving circuit. In an illustrative embodiment of the present disclosure, the power assist device is applicable to a vehicle or a powered exoskeleton suit that includes a torque sensor. In this context, when no torque detection signal is available from the torque sensor, the signal processor may determine a command value for motor torque based on the estimated value of human torque, and input the command value for motor torque to the motor driving circuit. With this construction, even when an abnormality occurs in the torque sensor due to certain influences, the power assist device is able to estimate the human torque. In other words, the power assist device can be designed with redundancy. Moreover, according to a previously determined time constraint, the signal processor may determine a command value for motor torque based on the estimated value of human torque, and input the command value for motor torque to the motor driving circuit. As a result, individual differences among torque sensors can be absorbed.

In an illustrative embodiment of the present disclosure, the motor driving circuit outputs a signal representing the magnitude of an electric current flowing through the motor. In the process of determining the estimated value of motor torque, the signal processor may acquire the signal representing the magnitude of the electric current flowing through the motor as information representing the operating state of the motor.

In an illustrative embodiment of the present disclosure, the power assist device may be used in estimating a human torque which is applied to the vehicle mechanism of an electrically assisted vehicle or the articulation mechanism of a powered exoskeleton suit by using system parameters of the vehicle mechanism or the articulation mechanism, calculating a torque of the motor from the estimated human torque, and driving the electrically assisted vehicle with the human torque and the torque of the motor. Herein, the power assist device updates the system parameters of the vehicle mechanism at moments when no human torque is being applied to the electrically assisted vehicle or powered exoskeleton suit. As used herein, a moment when no human torque is being applied to the electrically assisted vehicle or powered exoskeleton suit may be any moment at which no human torque is being generated, the human torque preferably being close to zero.

(Derivation of Sequential Least Squares Algorithm)

Hereinafter, an example derivation of a sequential least squares algorithm as has been referred to in the above embodiments will be described. Note that, the numbers of the mathematical equations will be denoted as "(1)", "(2)", etc., for distinction from Embodiment 1, and will be referred to as formula (1), etc., in the explanation.

Figure 11:
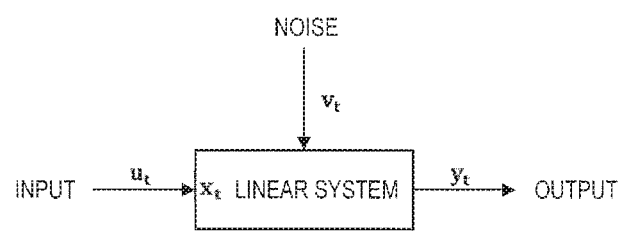
FIG. 11 is a diagram showing a model of a linear time invariant system.

FIG. 11 shows a model of a linear time invariant system. Assuming that the system order n of the linear time invariant system is known, its input-output relationship can be expressed by a difference equation such as the following formula, generally speaking.

[math. 7]

$$x_t = -\sum_{i=1}^{n} a_i \cdot x_{t-i} + \sum_{i=t}^{n} b_i \cdot u_{t-i} \qquad (1)$$

In the above formula, based on the notion that $x_t$ represents an output before noise $v_t$ is imposed, $x_t$ and $u_t$ respectively represent an output signal and an input signal of the system, where subscript t signifies sampling at time t. Moreover, $a_i$ and $b_i$ (i=1, 2, . . . , n) represent system parameters to be identified. Moreover, $v_t$ is meant to be white noise which is uncorrelated with the input signal $u_t$ and has a mean value of zero.

Thus, from these assumptions, $y_t$ in FIG. 11 can be expressed as follows.

[math. 8]

$$y_t = x_t + v_t \qquad (2)$$

Note that formula (2) is a noise model based on the premise that noise will be added. In practical situations, where it is judged that some other noise model would be appropriate, the subsequent formulation needs to be reviewed. First, substituting formula (2) into formula (1) gives the following formula.

[math. 9]

$$y_T = -\sum_{i=1}^{n} a_i \cdot y_{t-i} + \sum_{i=t}^{n} b_i \cdot u_{t-i} + r_t \qquad (3)$$

In the above, $r_t$ is expressed as follows.

[math. 10]

$$r_t = \sum_{i=0}^{n} a_i \cdot v_{t-i} \ (a_0 = 1) \qquad (4)$$

Formula (4) can be interpreted to mean that white noise $v_t$ is the noise that is contained in the linear system to be identified. Furthermore, in order to simplify the mathematical expression, two variables are introduced: an observation vector $z_t$, into which observed chronological signals are vectorized (2n×1); and a parameter vector θ, into which system model parameters to be identified are vectorized (2n×1).

[math. 11]

$$z_t = \begin{bmatrix} -y_{t-1} \\ \vdots \\ -y_{t-n} \\ u_{t-1} \\ \vdots \\ u_{t-n} \end{bmatrix} \quad (5)$$

$$0 = \begin{bmatrix} a_1 \\ \vdots \\ a_n \\ h_1 \\ \vdots \\ b_n \end{bmatrix} \quad (6)$$

By using formula (5) and formula (6), formula (3) is reexpressed into the following formula.

[math. 12]

$$y_t = z_t^T \cdot \theta + r_t \quad (7)$$

To identify the system means, in formula (7), to determine a θ that accounts for $y_t$ and $z_t$, which have been obtained as results of observation, with a maximum likelihood. One concept along this "maximum likelihood" is a so-called least-squares method, which may be summarized as determining a θ that minimizes a sum of squares of distances (errors) between a straight line which is expressed by formula (7) and results of observation, i.e., a sum J of squares of errors.

By using formula (7), a sum J of squares of errors can be expressed as follows.

[math. 13]

$$J = \sum_{t=1}^{K} (r_t)^2 = \sum_{t=1}^{K} (y_t - z_t^T \theta)^2 \quad (8)$$

Herein, K represents the current time, where time has a base of 1. A necessary and sufficient condition that minimizes this sum J of squares of errors is as follows.

[math. 14]

$$\frac{\partial J}{\partial \theta} = 0 \quad (9)$$

Formula (8) is substituted into formula (9), and with some reduction, the following formula is further obtained.

[math. 15]

$$-2 \cdot \sum_{t=1}^{K} z_t \cdot y_t + 2 \cdot \sum_{t=1}^{K} z_t \cdot z_t^T \cdot \theta = 0 \quad (10)$$

Since what needs to be determined is θ, formula (10) shall be solved with respect to θ. In order to emphasize that θ is an estimated value that has been identified, may be reexpressed as θ^ (which in any mathematical equation will be represented as "θ" with the hat "^" lying immediately above); then, θ^ can be expressed by the following formula.

[math. 16]

$$\hat{\theta} = \left( \sum_{t=1}^{K} z_t \cdot z_t^T \right)^{-1} \cdot \left( \sum_{t=1}^{K} z_t \cdot y_t \right) \quad (11)$$

In order for formula (11) to mathematically hold true, presence of an inverse matrix needs to be proven. In practice, however, it is rarely the case that an inverse matrix does not exist; therefore, a mathematical proof for the presence of an inverse matrix is omitted here.

Now, subscript K is added to θ^ in formula (11) to expressly indicate that θ^ is a function of K.

[math. 17]

$$\hat{\theta}_K = \left( \sum_{t=1}^{K} z_t \cdot z_t^T \right)^{-1} \cdot \left( \sum_{t=1}^{K} z_t \cdot y_t \right) \quad (12)$$

Next, the inverse matrix from formula (12) is designated as follows.

[math. 18]

$$P_K = \left( \sum_{t=1}^{K} z_t \cdot z_t^T \right)^{-1} \quad (13)$$

Therefore, substituting formula (13) into formula (12) gives the following formula.

[math. 19]

$$\hat{\theta}_K = P_K \cdot \left( \sum_{t=1}^{K} z_t \cdot y_t \right) \quad (14)$$

The objective here is to reexpress formula (14) into a form that permits sequential calculations. For this objective, formula (14) is slightly transformed into formula (15).

[math. 20]

$$\hat{\theta}_K = P_K \cdot \left( \sum_{t=1}^{K} z_t \cdot y_t + z_K \cdot y_K \right) \quad (15)$$

Now, the first term in the parentheses on the right-hand side of formula (15) can be converted into the expression of formula (16), from formula (14) and through STEP1 and STEP2 below.

STEP1: Both sides of formula (14) are multiplied with $(P_K)^{-1}$ from the left.

[math. 21]

$$(P_K)^{-1} \cdot \hat{\theta}_K = \sum_{t=1}^{K} z_t \cdot y_t \qquad (16)$$

STEP2: K in formula (16) is replaced by K−1.

[math. 22]

$$(P_{K-1})^{-1} \cdot \hat{\theta}_{K-1} = \sum_{t=1}^{K-1} z_t \cdot y_t \qquad (17)$$

Substituting formula (17) into formula (15) gives the following formula.

[math. 23]

$$\hat{\theta}_K = P_K \{(P_{K-1})^{-1} \cdot \hat{\theta}_{K-1} + z_K \cdot y_K\} \qquad (18)$$

Therefore, formula (12) has apparently been converted into formula (18), which is a recurrence formula that permits sequential calculations. However, since a high load consists in the process of calculating an inverse matrix $(P_{K-1})^{-1}$ (of an inverse matrix), the inverse matrix $(P_{K-1})^{-1}$ shall be eliminated from the calculation through STEP 1 to STEP5 below.
STEP1: Inverse matrices of both sides of formula (13) are taken.

[math. 24]

$$(P_K)^{-1} = \sum_{t=1}^{K} z_t \cdot z_t^T \qquad (19)$$

STEP2: Formula (19) is transformed.

[math. 25]

$$(P_k)^{-1} = \sum_{t=1}^{K-1} z_t \cdot z_t^T + z_K \cdot z_K^T \qquad (20)$$

STEP3: As can be inferred from formula (19), the first term on the right-hand side of formula (20) is equivalent to $(P_{K-1})^{-1}$.
STEP4: Therefore, formula (20) can be expressed as formula (21).

[math. 26]

$$(P_K)^{-1} = (P_{K-1})^{-1} + z_K z_K^T \qquad (21)$$

STEP5: Terms on the right-hand and left-hand sides of formula (21) are transposed. Consequently, as indicated in formula (22), a recurrence formula for the inverse matrix $(P_{K-1})^{-1}$ is obtained.

[math. 27]

$$(P_{K-1})^{-1} = (P_K)^{-1} - z_K z_K^T \qquad (22)$$

Substituting formula (22) into formula (18) gives the following formula.

[math. 28]

$$\hat{\theta}_K = P_K \cdot ((P_K^{-1} - z_K \cdot z_K^T) \cdot \hat{\theta}_{K-1} + z_K \cdot y_k) \qquad (23)$$

With reduction from formula (23), formula (24) is finally obtained.

[math. 29]

$$\hat{\theta}_K = \hat{\theta}_{K-1} + P_K \cdot z_K \cdot (y_K - z_K^T \cdot \hat{\theta}_{K-1}) \qquad (24)$$

Formula (24) is the base formula of the sequential estimation algorithm of interest. In order for the sequential estimation algorithm to be self-complete, supplementary calculation formulae need to be additionally introduced to formula (24), in order to eliminate the need to tediously calculate the inverse matrix $P_K$. Before explaining these, the physical meaning of formula (24) is described below. In formula (24), $Z_K^T \hat{\theta}_{K-1}$ means an assertion (estimated value) that the output $y_K$ at the current time of sampling K must be this, based on $\hat{\theta}_{K-1}$ which is a result of identifying the system at the previous time of sampling K−1. The reason is that, once noise $r_K$ is ignored, then $Z_K^T \hat{\theta}_{K-1}$ clearly points to $y_K$ at the current time of sampling K. Now, the system to be identified is indicated by formula (7); formula (7) is reexpressed as follows, with respect to the current time K of sampling.

[math. 30]

$$y_K = z_K^T \cdot \hat{\theta}_{K-1} + r_K \qquad (25)$$

In actuality, as is indicated by formula (25), $Z_K^T \theta_{K-1}$ contains an error corresponding to the noise $r_K$ which was ignored (in a time-invariant system). In order to clearly show that this quantity is an estimated value of the current time of sampling K as viewed from the previous time of sampling K−1, it is expressed as follows.

[math. 31]

$$\hat{y}_K = z_K^T \cdot \hat{\theta}_{K-1} \qquad (26)$$

By using formula (26), what is in the parentheses in the second term on the right-hand side of formula (24) will be as follows.

[math. 32]

$$y_K - z_K^T \cdot \hat{\theta}_{K-1} = y_K - \hat{y}_K \qquad (27)$$

This represents how well the estimation result $\hat{y}_K$ accounts for the currently-observed output signal $y_K$, i.e., an error of the estimation result. By expressing this estimation error as $\varepsilon_K$, the following formula is further obtained.

[math. 33]

$$\varepsilon_K = (y_K - z_K^T \cdot \hat{\theta}_{K-1}) = y_K - \hat{y}_K \qquad (28)$$

Now, looking at formula (24), the estimated value $\hat{\theta}_K$ at the current time of sampling K is the estimated value $\hat{\theta}_{K-1}$ at the previous time of sampling K−1 plus a quantity which is obtained by multiplying the estimation error $\varepsilon_K$ with $P_K \cdot Z_K$. Restated mathematically, formula (24) means that the previously estimated value $\hat{\theta}_{K-1}$ is sequentially corrected with a quantity which is obtained by multiplying the estimation error $\varepsilon_K$ with the correction gain $P_K \cdot Z_K$, whereby the latest estimated value $\hat{\theta}_K$ is determined.

Next, supplementary calculation formulae for allowing formula (24) to be established as a self-complete sequential estimation algorithm will be described. In other words, as indicated by formula (13), $P_K$ in the correction gain $P_K \cdot Z_K$ is an inverse matrix; and the objective is to eliminate the need to directly calculate the inverse matrix.

Firstly, inverse matrices of both sides of formula (21) may be taken as follows.

[math. 34]

$$P_K = \{(P_{K-1})^{-1} + z_K \cdot z_K^T\}^{-1} \quad (29)$$

Now, without proof, a theorem called the matrix inversion lemma is employed.

Matrix Inversion Lemma

For a given regular matrix A, the following formula holds true. Herein, I denotes a unit matrix.

[math. 35]

$$(A+B\cdot C)^{-1} = A^{-1} - A^{-1}\cdot B\cdot(I+C\cdot A^{-1}\cdot B)^{-1}\cdot C\cdot A^{-1} \quad (30)$$

To the right-hand side of formula (29), the matrix inversion lemma formula (30) is applied, whereby the following formula is obtained.

[math. 36]

$$\{(P_{K-1})^{-1} + z_K \cdot z_K^T\}^{-1} = P_{K-1} - P_{K-1}\cdot z_K\cdot(I+z_K^T\cdot P_{K-1}\cdot z_K)^{-1}\cdot z_K^T\cdot P_{K-1} \quad (31)$$

Furthermore, since the observation vector $Z_K$ in this case is sized (2n×1), $(I+Z_K^T\cdot P_{K-1}\cdot Z_K)^{-1}$ in the second term on the right-hand side of formula (31) must be a scalar. Therefore, it can be stated as follows.

[math. 37]

$$\{(P_{K-1})^{-1} + z_K \cdot z_K^T\}^{-1} = P_{K-1} - \frac{P_{K-1}\cdot z_K\cdot z_K^T\cdot P_{K-1}}{1+z_K^T\cdot P_{K-1}\cdot z_K} \quad (32)$$

From formula (30) and formula (32), the following formula is further obtained.

[math. 38]

$$P_K = P_{K-1} - \frac{P_{K-1}\cdot z_K\cdot z_K^T\cdot P_{K-1}}{1+z_K^T\cdot P_{K-1}\cdot z_K} \quad (33)$$

Furthermore, formula (33) is multiplied with $Z_K$ from the right, whereby the following formulae (34) to (36) are obtained.

[math. 39]

$$P_K \cdot z_K = P_{K-1}\cdot z_K - \frac{P_{K-1}\cdot z_K\cdot z_K^T\cdot P_{K-1}}{1+z_K^T\cdot P_{K-1}\cdot z_K}\cdot z_K \quad (34)$$

$$P_K \cdot z_K = P_{K-1}\cdot z_K\left(I - \frac{z_K^T\cdot P_{K-1}\cdot z_K}{1+z_K^T\cdot P_{K-1}\cdot z_K}\right) \quad (35)$$

$$P_K \cdot z_K = \frac{P_{K-1}\cdot z_K}{1+z_K^T\cdot P_{K-1}\cdot z_K} \quad (36)$$

Thus, a concise expression was obtained for $P_K\cdot Z_K$ in the second term on the right-hand side of formula (24) to be solved through sequential calculations.

In summary of the above, formula (24), formula (28), formula (33), and formula (36) may be solved as a sequential least squares method algorithm. These formulae are the eqs. (a-1) to (a-4) which are stated in "math. 6" above.

INDUSTRIAL APPLICABILITY

The present disclosure can be used in estimating a human torque which is applied to an electrically assisted vehicle, regardless of whether a torque sensor is provided or not, for example. As the electrically assisted vehicle, an electrically assisted bicycle, an electric trolley, an electrically assisted wheelchair, an electric cart, or the like is applicable. Moreover, the present disclosure can be used in estimating a human torque which is applied to a joint of a powered exoskeleton suit.

REFERENCE SIGNS LIST 1 electrically assisted bicycle
2 electric trolley
10 handle bar
11 frame
12 front wheel
13 rear wheel
14 saddle
15 chain
16 pedal
17 crank
20 microprocessor
21 ROM
22 RAM
23a, 24a computer program
23b, 24b parameter
25 motor driving circuit
26 acceleration sensor
27 pedal angle sensor
30 motor
40 battery
100 power assist device

The invention claimed is:

1. A power assist device for a vehicle which includes a wheel and which is driven by a first force, the power assist device comprising:
 a motor to generate a motor torque;
 a motor driving circuit to supply an electric power to the motor;
 a sensor to output a signal which is in accordance with a rotational speed of the wheel;
 a memory storing information of a parameter defining a transfer function that interrelates a total torque to be input to the vehicle and a rotational speed of the wheel, and an inverse transfer function thereof; and
 a signal processor connected to the memory and the motor driving circuit, wherein,
 the signal processor is configured to:
 (0) receive the signal which is output from the sensor, and determines a detected value of rotational speed of the wheel,
 (1) read information of the parameter from the memory, and, based on the inverse transfer function defined by the parameter, determines an estimated value of total torque from the detected value of rotational speed of the wheel,
 (2) acquire information representing an operating state of the motor, and, based on the information, determines an estimated value of a motor torque that is being generated by the motor, (3) determine, as an estimated value of the first force, a value which is obtained by subtracting the estimated value of motor torque from the estimated value of total torque, (4) determine a command value for the motor torque based on the estimated value of the first force, and inputs the command value for the motor torque to the motor driving circuit, and (5) update at least a portion of the information of the parameter stored in the memory so that an error between the detected value of rotational speed of the wheel and an estimated value of rotational speed of the wheel that is determined from a given torque value based on the transfer function defined by the parameter is reduced.

2. The power assist device of claim 1, wherein the given torque value is the estimated value of the total torque.

3. The power assist device of claim 1, wherein the signal processor is configured to perform the process of (5) by using a sequential least squares algorithm.

4. The power assist device of claim 1, wherein the transfer function defined by the parameter is a transfer function of a linear first order lag system.

5. The power assist device of claim 4, wherein a time constant of the transfer function of the linear first order lag system is determined based on a moment of inertia and a viscous drag coefficient.

6. The power assist device of claim 1, wherein the signal processor is configured to perform the process of (5) while substantially absent of the first torque.

7. The power assist device of claim 6, wherein,
the vehicle comprises pedals, and is driven by the first torque which is input via the pedals;
the power assist device further comprises a pedal angle sensor to output an angle signal which is in accordance with angles of the pedals; and
the signal processor is configured to:
    perform the process of (5) when the angle signal which is output from the pedal angle sensor indicates a top dead center angle or a bottom dead center angle of the pedals, or when the first force is not being generated on the basis of the angle signal which is output from the pedal angle sensor.

8. The power assist device of claim 6, wherein,
the vehicle comprises a grip, and is driven by a second force which is input via the grip;
the power assist device further comprises a detector to detect whether the second force is being applied to the grip or not; and
the signal processor performs the process of (5) when the detector detects an absent of the second force.

9. The power assist device of claim 1, further comprising an inclination angle sensor to output a signal which is in accordance with an acceleration or an angle of inclination of a road surface, wherein,
before the process of (3), the signal processor is configured to:
(6) determine an estimated value of angle of inclination of the road surface based on the signal which is output from the inclination angle sensor, and estimates a slope resistance torque from the estimated value of angle of inclination, and
(7) estimate an aerodynamic resistance torque which is proportional to a square of the detected value of rotational speed of the wheel, and,
in the process of (3), determines an estimated value of the first force based on a value which is obtained by subtracting the estimated value of the motor torque from the estimated value of the total torque and adding up the slope resistance torque and the aerodynamic resistance torque.

10. The power assist device of claim 9, wherein,
the inclination angle sensor is an acceleration sensor; and
the signal processor is configured to perform the process of (6) by integrating a signal which is output from the acceleration sensor over a predetermined time slot.

11. The power assist device of claim 1, further comprising a torque sensor to output a torque detection signal which is in accordance with the first force, wherein,
the signal processor is configured to
    perform one of: a process of determining the command value for the motor torque based on the torque detection signal and inputting the command value for the motor torque to the motor driving circuit; and the processes from (0) to (4).

12. The power assist device of claim 11, wherein the signal processor is configured to perform the processes from (0) to (4) when the torque detection signal is not available.

13. The power assist device of claim 12, wherein the signal processor is configured to perform the processes from (0) to (4) in accordance with a previously determined time constraint.

14. The power assist device of claim 1, wherein,
the motor driving circuit outputs a signal representing a magnitude of an electric current flowing through the motor; and
in the process of (2), the signal processor acquires a signal representing the magnitude of the electric current flowing through the motor as information representing the operating state of the motor.

15. The power assist device of claim 14, wherein,
the sensor is a Hall sensor that outputs a signal representing a rotational speed of the motor which is in accordance with the rotational speed of the wheel; and
a plurality of said Hall sensors are provided.

16. The power assist device of claim 15, wherein, in the process of (4), the signal processor inputs the command value for motor torque to the motor driving circuit as a PWM signal.

17. An electrically assisted vehicle comprising:
a wheel; and
the power assist device of claim 1, wherein,
the motor of the power assist device is mechanically connected to the wheel; and
the wheel rotates with the first torque and the motor torque of the motor.

18. A signal processing module comprising:
a memory storing information of a parameter defining a transfer function that interrelates a total torque to be input to an electrically assisted vehicle which includes a motor and a wheel and a rotational speed of the wheel, and an inverse transfer function thereof; and
a signal processor connected to the memory, wherein,
when incorporated in the electrically assisted vehicle, the signal processor is connected to a sensor to output a signal which is in accordance with the rotational speed of the wheel and to a driving circuit for the motor, and is configured to:
(0) receive the signal which is output from the sensor, and determines a detected value of rotational speed of the wheel,
(1) read information of the parameter from the memory, and, based on the inverse transfer function defined by the parameter, determines an estimated value of the total torque from the detected value of rotational speed of the wheel, (2) from the driving circuit, acquire information representing an operating state of the motor, and, based on the information, determines an estimated value of a motor torque that is being generated by the motor, (3) determine, as an estimated value of a pedal torque, a value which is obtained by subtracting the estimated value of a motor torque from the estimated value of the total torque, (4) determine a command value for motor torque based on the estimated value of first torque, and inputs the command value for the motor torque to the driving circuit, and (5) update at least a portion of the information of the parameter stored in the memory so that an error between the detected value of rotational speed of the wheel and an estimated value of rotational speed of the wheel that is determined from a given torque value based on the transfer function defined by the parameter is reduced.

19. A power assist device for use in estimating a pedal torque to be applied to a vehicle mechanism of an electrically assisted vehicle by using a system parameter of the vehicle mechanism, calculating a torque for a motor from the estimated pedal torque, and driving the electrically assisted vehicle with the estimated pedal torque and the torque of the motor, wherein, the system parameter of the vehicle mechanism is updated at a moment absent of the estimated pedal torque, wherein the system parameter of the vehicle mechanism defines a transfer function and an inverse transfer function of the transfer function;

the transfer function receives an overall torque input to the vehicle mechanism and outputs a rotational speed of a wheel, the overall torque including the estimated pedal torque and the torque of the motor;

the inverse transfer function receives the rotational speed of the wheel and outputs an estimated overall torque, the estimated overall torque including the estimated pedal torque and an estimated torque of the motor;

the estimated overall torque is obtained by using the inverse transfer function and the rotational speed of the wheel;

the estimated torque of the motor is obtained on a basis of a rotation control technique to be applied to the motor; and the estimated pedal torque is obtained by subtracting the estimated torque of the motor from the estimated overall torque.

* * * * *